United States Patent
Choi et al.

(10) Patent No.: US 9,367,920 B2
(45) Date of Patent: Jun. 14, 2016

(54) METHOD AND APPARATUS FOR PROCESSING IMAGES

(71) Applicant: SAMSUNG ELECTRONICS CO., LTD., Suwon-si, Gyeonggi-do (KR)

(72) Inventors: Ouk Choi, Yongin-si (KR); Kee-chang Lee, Yongin-si (KR); Seung-won Jung, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 14/327,682

(22) Filed: Jul. 10, 2014

(65) Prior Publication Data
US 2015/0049937 A1    Feb. 19, 2015

(30) Foreign Application Priority Data
Aug. 19, 2013  (KR) .......................... 10-2013-0098134

(51) Int. Cl.
| | |
|---|---|
| G06K 9/00 | (2006.01) |
| G06T 7/00 | (2006.01) |
| G06K 9/62 | (2006.01) |
| G06T 3/40 | (2006.01) |

(52) U.S. Cl.
CPC ............ *G06T 7/0051* (2013.01); *G06K 9/6267* (2013.01); *G06T 3/4061* (2013.01); *G06T 7/0081* (2013.01); *G06T 2200/04* (2013.01); *G06T 2207/10028* (2013.01); *G06T 2207/20221* (2013.01)

(58) Field of Classification Search
CPC .................. G06K 9/6267; G06K 2207/10028; G06K 2207/20221; G06K 7/0081
USPC .......................................................... 382/154
See application file for complete search history.

(56) References Cited

U.S. PATENT DOCUMENTS

| | | | |
|---|---|---|---|
| 8,126,291 B2 | 2/2012 | Paragios et al. ............... | 382/294 |
| 2011/0115886 A1 | 5/2011 | Nguyen et al. .................. | 348/47 |
| 2011/0285813 A1* | 11/2011 | Girdzijauskas .... | H04N 13/0011 348/42 |
| 2012/0306904 A1 | 12/2012 | Francois et al. .............. | 345/589 |

(Continued)

FOREIGN PATENT DOCUMENTS

| KR | 10-2012-0031012 | 3/2012 |
|---|---|---|
| KR | 10-2013-0006246 | 1/2013 |

OTHER PUBLICATIONS

Gaurav Chaurasia, et al. "Depth Synthesis and Local Warps for Plausible Image-Based Navigation", ACM Transactions on Graphics, vol. 32, No. 3, Article 30, pp. 1-12, (2013).

(Continued)

*Primary Examiner* — Manuchehr Rahmjoo
(74) *Attorney, Agent, or Firm* — Harness, Dickey & Pierce, P.L.C.

(57) ABSTRACT

Provided is an image processing method including: receiving a depth map and a color image with respect to a predetermined scene; projecting a plurality of points included in the depth map, onto the color image; segmenting the color image, onto which the depth map is projected, by using at least two image segmentation methods to generate respective segmentation results, and classifying the plurality of points included in the color image into at least one set according to the respective segmentation results; assigning a depth value to each of the plurality of points of the color image included in the set; and outputting the color image, to which the depth values are assigned.

27 Claims, 27 Drawing Sheets

(56) References Cited

U.S. PATENT DOCUMENTS

2014/0146139 A1* 5/2014 Schwartz .......... H04N 13/0018
348/43
2015/0071526 A1* 3/2015 Nguyen .................... G06T 5/10
382/154

OTHER PUBLICATIONS

Ouk Choi, et al. "A Consensus-Driven Approach for Structure and Texture Aware Depth Map Upsampling", IEEE Transactions on Image Processing, vol. 23, No. 8, pp. 3321-3335, (2014).

European Search Report dated Jan. 27, 2015 issued in corresponding European Application No. 14179344.8.

Achanta, Radhakrishna et al., "*SLIC Superpixels Compared to State-of-the-art Superpixel Methods*", Journel of Latex Class Files, vol. 6, No. 1, Dec. 2011, pp. 1-8.

Min, Dongbo et al., "*Depth Video Enhancement Based on Weighted Mode Filtering*", IEEE Transactions on Image Processing, vol. 21, No. 3, Mar. 2012, pp. 1176-1190.

Felzenszwalb, Pedro F., and Daniel P. Huttenlocher. "Efficient Graph-Based Image Segmentation." *International Journal of Computer Vision* 59.2 (2004): 167-181.

* cited by examiner

METHOD AND APPARATUS FOR PROCESSING IMAGES

RELATED APPLICATIONS

This application claims the benefit of Korean Patent Application No. 10-2013-0098134, filed on Aug. 19, 2013, in the Korean Intellectual Property Office, the disclosure of which is incorporated herein in its entirety by reference.

BACKGROUND

1. Field

One or more embodiments relate to methods and apparatuses for processing images, and more particularly, to methods and apparatuses for processing images, whereby a resolution of a depth map may be upsampled to a resolution of a color image higher than the resolution of the depth map, by using the color image.

2. Description of the Related Art

According to the related art, research has been actively conducted into cameras for capturing two-dimensional (2D) images, and a number of related products have been released. While analog cameras have been widely used in the related art, recently, digital cameras have become more widely used. Research into digital cameras is also being vigorously conducted. In detail, research into digital cameras capable of capturing images having a high resolution and a high quality is being continuously conducted.

Recently, demands on three-dimensional (3D) image capturing devices have been increasing with the supply of 3D display apparatuses. Various types of 3D cameras are available to purchase, and techniques that apply 3D cameras are also being developed.

For example, a technique of controlling an electronic device using gesture of a person without a physical controller such as a joystick has been introduced. Also, due to 3D cameras, capturing of a scene or a 3D model of an object has been simplified compared to the past.

3D cameras are capable of providing 3D position information of a surface of an object in real time. However, the 3D cameras have a lower resolution than 2D cameras. A resolution of a product having the highest resolution among currently commercialized 3D cameras is 320*240 pixels. This is about 1/27 of a full HD resolution (1920*1080).

In addition, current 3D cameras include not only a sensor that senses a depth but also a camera that senses colors. Thus, high-resolution color information of a scene may be provided in addition to 3D depth information of the scene.

SUMMARY

One or more embodiments include methods and apparatuses for processing images whereby a resolution of a depth map may be upsampled to a resolution of a color image that is higher than the resolution of the depth map, by using the color image.

One or more embodiments include methods and apparatuses for processing images whereby a depth map of an object may be upsampled such that a boundary of the depth map of the object corresponds to a boundary of a color image.

One or more embodiments include methods and apparatuses for processing images whereby a resolution of a depth map may be upsampled to a higher resolution.

One or more embodiments include methods and apparatuses for processing images whereby a depth map having the same viewpoint and the same resolution as those of the color image may be generated by using another depth map and a color image respectively received by using a depth sensor and a color camera that have similar viewpoints and similar directions.

According to one or more embodiments, an image processing method includes: receiving a depth map and a color image with respect to a predetermined scene; projecting a plurality of points included in the depth map, onto the color image; segmenting the color image, onto which the depth map is projected, by using at least two image segmentation methods to generate respective segmentation results, and classifying the plurality of points included in the color image into at least one set according to the respective segmentation results; assigning a depth value to each of the plurality of points of the color image included in the set; and outputting the color image, to which the depth value is assigned.

A resolution of the depth map may be lower than a resolution of the color image.

The projecting of the plurality of points included in the depth map, onto the color image may include: detecting discontinuous points from among a plurality of first points of the depth map, which is discontinuous from second points, by using the depth values of the plurality of first points and depth values of the second points adjacent to the first points; generating meshes by using differences between the depth values of the first points and the depth values of the second points, and the first points; and projecting the meshes onto the color image.

The detecting of the discontinuous points from among the first points, which is discontinuous from the second points, may include detecting the discontinuous point by using a difference between the depth value of the first point and the depth value of the second point or a result of determining whether, from among at least one object existing within the scene, a first object corresponding to the first point and a second object corresponding to the second point are identical to each other.

The detecting the discontinuous points from among the first points, which is discontinuous from the second points, may include: calculating a vector corresponding to a tangential plane of the first point with respect to each of the first points of the depth map; calculating a minimum value from among differences between predicted depth values of the first point that are calculated by using the vector of at least one third point included in a predetermined area around the first point, and the depth value of the first point included in the depth map, for each of the first points; and detecting discontinuous points from among the first points, from the second points, by using the depth values of the first points, the depth values of the second points, the minimum values of the first points, and the minimum values of the second points.

The generating of the meshes may include: connecting to the first point a fourth point adjacent to the first point in a horizontal direction; connecting to the first point a fifth point adjacent to the first point in a vertical direction; and connecting points corresponding to a smaller value from among a difference between the depth value of the fourth point and the depth value of the fifth point and a difference between a depth value of a sixth point that is adjacent to the fourth point in a vertical direction and to the fifth point in a horizontal direction and the depth value of the first point.

The classifying of the plurality of points included in the color image into at least one set may include: assigning a depth value to each of the plurality of points included in the projected meshes by using a depth value of each vertex of the projected meshes; detecting at least one mesh, from among the projected meshes, that includes at least one vertex that is covered by another mesh, and a discontinuous area including an area of a predetermined range around the discontinuous points; detecting a hole area, from the projected meshes, including at least one mesh including the at least one discontinuous point; generating at least one virtual vertex in the hole area; segmenting the color image by using the at least two image segmentation methods, the at least one vertex, and the at least one virtual vertex; and classifying the points included in the color image into the at least one set according to respective segmentation results.

The assigning of a depth value to each of a plurality of points included in the projected mesh may include: interpolating and assigning the depth values to the plurality of points included in the projected meshes by using plane equations based on positions of the vertexes; and setting a smallest value from among the depth values corresponding to the points, with respect to a point corresponding to at least two of the meshes from among the points included in the color image.

The segmenting of the color image by using the at least two image segmentation methods, the at least one vertex, and the at least one virtual vertex may include: generating, by using a first image segmentation method, a first segmentation image that is obtained by segmenting the color image, onto which the mesh is projected, into at least one area that includes either one of the vertexes or one of the virtual vertexes, or that does not include any of the vertexes nor any of the virtual vertexes; and generating, by using a second image segmentation method that is different from the first image segmentation method, a second segmentation image that is obtained by segmenting the color image, onto which the mesh is projected, into at least one area that includes either one of the vertexes or one of the virtual vertexes, or that does not include any of the vertexes nor any of the virtual vertexes.

The classifying of the points included in the color image into the set according to the respective segmentation results may include: generating a third segmentation image obtained by segmenting the depth map into at least one area and assigning different labels to respective areas of the third segmentation image; assigning, to the respective areas of the first segmentation image, a label corresponding to the label assigned to the areas of the third segmentation image corresponding to the vertexes included in the respective areas of the first segmentation image; assigning a label corresponding to the label assigned to the areas of the third segmentation image corresponding to the vertexes included in the respective areas of the second segmentation image to the respective areas of the second segmentation image; and generating a first set including the at least one first pixel in which the label corresponding to the first pixel is identical to the label corresponding to a second pixel of the second segmentation image corresponding to the first pixel.

The assigning of the depth value to each of the plurality of points of the color image included in the set may include generating a depth histogram for each of third pixels included in the first set based on a color and a position of the third pixel and setting the depth value corresponding to a peak of the depth histogram, as a depth value of the third pixel.

The assigning of the depth value to each of the plurality of points of the color image included in the set may include: generating a first depth histogram for each of third pixels included in the first set using the depth value of at least one fourth pixel that is included in an area of a predetermined range around the third pixel and to which the depth value is assigned, a position difference between the third pixel and the fourth pixel, and a color difference between the third pixel and the fourth pixel; generating a second depth histogram by using the depth value of at least one fifth pixel corresponding to a same label as a label corresponding to the third pixel, a position difference between the third pixel and the fifth pixel, and a color difference between the third pixel and the fifth pixel; and setting the depth value corresponding to a peak of a result of summing the first and second depth histograms, to which weights are respectively applied, as a depth value of the third pixel.

The classifying of the points included in the color image into the set according to the respective segmentation results may further include: generating a second set including, from among the first pixels, the at least one first pixel in which at least one of the area corresponding to the first pixel or the area corresponding to the second pixel corresponding to the first pixel includes the virtual vertex.

The assigning a depth value to a point of the color image included in the set may include selecting sixth pixels included in the second set based on colors and positions of the sixth pixels, segmenting the sixth pixels into at least one sub-set that includes a seventh pixel to which the depth value is assigned, setting a depth value of the seventh pixel included in the sub-set in which the sixth pixels are included, as a depth value of the sixth pixels.

The classifying of the points included in the color image into the set according to the respective segmentation results may further include generating, from among the first pixels, a third set including the at least one first pixel, the label of which is different from the label corresponding to the first pixel corresponding to the second pixel, and whose area corresponding to the first pixel or corresponding to the second pixel corresponding to the first pixel includes the at least one vertex.

The assigning of the depth value to a point of the color image included in the set may include: generating, for each of eighth pixels included in the third set, a third depth histogram may be generated based on the depth value of at least one ninth pixel that is included in an area of a predetermined range around the eighth pixel and to which the depth value is assigned, a position difference between the eighth pixel and the ninth pixel, and a color difference between the eighth pixel and the ninth pixel; generating a fourth histogram by using the depth value of at least one tenth pixel corresponding to a same label as a label corresponding to the eighth pixel, a position difference between the eighth pixel and the at least one tenth pixel, and a color difference between the eighth pixel and the at least one tenth pixel; generating a fifth depth histogram by using the depth value of at least one eleventh pixel that surrounds the third set and to which the depth value is assigned, a position difference between the eighth pixel and the at least one eleventh pixel, and a color difference between the eighth pixel and the at least one eleventh pixel; and generating a summed histogram obtained by summing the third, fourth, and fifth depth histograms by applying weights to the third, fourth, and fifth depth histograms.

The image processing method may further include, after the generating of the summed histogram, setting the depth value corresponding to a peak of the first summed histogram as a depth value of the eighth pixel.

The image processing method may further include, after generating the summed histogram, setting a depth value that maximizes points of a Markov Random Field that is modeled by using a weight based on a color difference between the eighth pixel and a pixel adjacent to the eighth pixel and the summed histogram, as a depth value of the eighth pixel.

The classifying of the points included in the color image into the set according to the respective segmentation results may further include: generating a fourth set including, from among the plurality of first pixels, the at least one first pixel in which the area corresponding to the first pixel and the area corresponding to the second pixel corresponding to the first pixel do not include any of the vertexes nor any of the virtual vertexes.

The assigning of a depth value to a point of the color image included in the set may include generating a depth histogram, for each of twelfth pixels included in the fourth set, by using the depth value of at least one thirteenth pixel that surrounds the fourth set and a position difference between the twelfth pixel and the thirteenth pixel.

The image processing method may further include, after generating the depth histogram, setting the depth value corresponding to a peak of the depth histogram as a depth value of the twelfth pixel.

The image processing method may further include, after generating a depth histogram, setting a depth value that maximizes points of a Markov Random Field that is modeled by using a weight based on a color difference between the twelfth pixel and a pixel adjacent to the twelfth pixel, and by using the depth histogram, as a depth value of the twelfth pixel.

According to one or more embodiments, an image processing apparatus includes: an input unit that receives or generates a depth map or a color image of a predetermined scene; an image processing unit that projects a plurality of points included in the depth map, and segments the color image onto which the depth map is projected, by using at least two image segmentation methods to generate respective segmentation results, classifies the plurality of points included in the color image into at least one set according to the respective segmentation results, and assigns depth values to the plurality of points of the color image, included in the at least one set; and an output unit that outputs the color image, to which the depth values are assigned.

According to one or more embodiments a method includes obtaining a depth map and a color image of a scene having an object therein where the object has a boundary, the depth map has a first spatial resolution and the color image has a second spatial resolution higher than the first resolution, and upsampling the first spatial resolution to match the second spatial resolution with the object boundary in the depth map and the color image matching.

According to one or more embodiments a method includes obtaining a depth map and a color image of a scene, projecting the depth map onto the color image by: correlating points with depth values within a threshold of each other and forming a mesh of correlated points of the color image, segmenting the color image using the mesh and the depth values and generating sets from the segments responsive to common features of the segments, and assigning set depth values to the sets, and outputting the set depth values corresponding to color pixels of the color image, where the common features comprise segments comprising a same label, segments not comprising the same label, segments comprising a same virtual vertex, and segments not comprising the same virtual vertex Additional aspects will be set forth in part in the description which follows and, in part, will be apparent from the description, or may be learned by practice of the presented embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the embodiments, taken in conjunction with the accompanying drawings of which.

DETAILED DESCRIPTION

Figure 1:
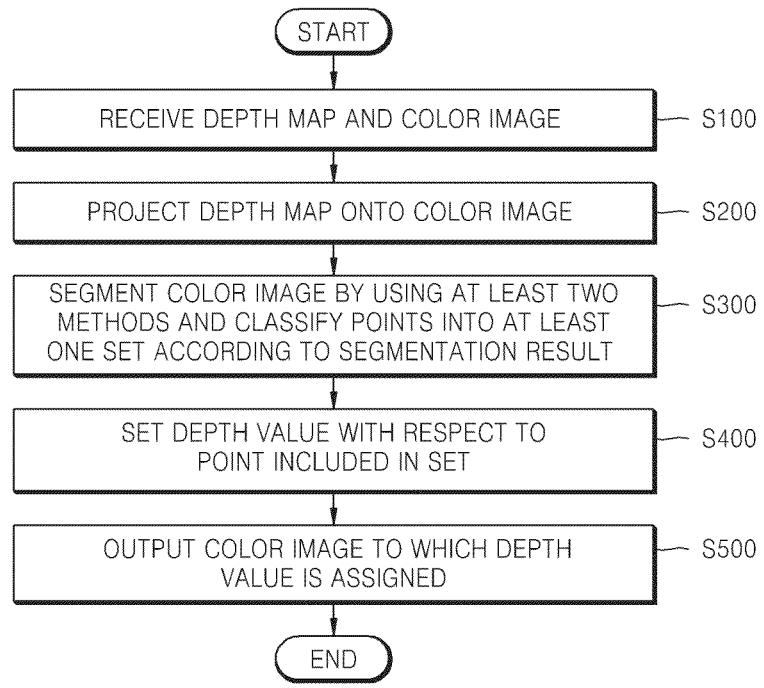
FIG. 1 is a flowchart illustrating an image processing method according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The advantages and features of the methods of achieving the advantages and features will be described more fully with reference to the accompanying drawings, in which exemplary embodiments are shown. The embodiments may, however, be embodied in many different forms and should not be construed as being limited to the embodiments set forth herein; rather these embodiments are provided so that this disclosure will be thorough and complete, and will fully convey the concept to one of ordinary skill in the art.

It will be understood that, although the terms first, second, etc., may be used herein to describe various components, these components should not be limited by these terms. These terms are only used to distinguish one component from another component. Thus, a first component discussed below could be termed a second component without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated components and/or operations, but do not preclude the presence or addition of one or more other components, operations, and/or groups thereof.

Unless defined differently, all terms used in the description including technical and scientific terms have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

Hereinafter, an image processing method and an image processing apparatus 100 according to an embodiment will be described in detail with reference to FIGS. 1 through 38.

FIG. 1 is a flowchart illustrating an image processing method according to an embodiment. Referring to FIG. 1, according to the image processing method of the current embodiment, first, a depth map and a color image regarding a predetermined scene may be received in operation S100.

Figure 2:
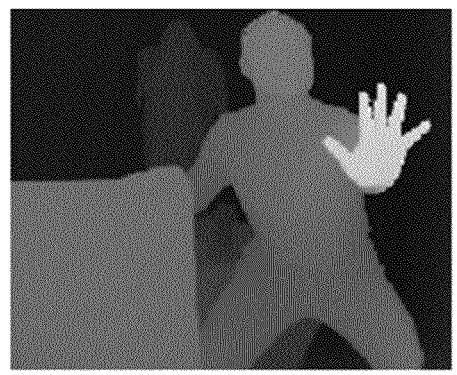
FIG. 2 is a visual image illustrating a depth map received according to an embodiment.

FIG. 2 is a visual image illustrating a depth map received according to an embodiment. A depth map may be generated by using a depth sensor. Also, a depth map may be a result of converting a sensing result of a depth sensor. The depth sensor may be, for example, a stereoscopic camera, a pattern projection camera, a time of flight (TOF) camera, or other similar devices.

Figure 3:
FIG. 3 illustrates a color image received according to an embodiment.

FIG. 3 is a view illustrating a color image received according to an embodiment. A color image may be generated by using an optical photographing device. Also, a color image may be a result of converting a photographing result of an optical photographing device. The optical photographing device may be, for example, a complementary-metal-oxide-semiconductor (CMOS) camera, a charge-coupled device (CCD) camera, or other similar devices.

According to the current embodiment, the depth map and the color image may be respectively received by using a depth sensor and a color camera that have similar viewpoints and similar directions. Also, a resolution of the color image may be higher than that of the depth map.

Figure 4:
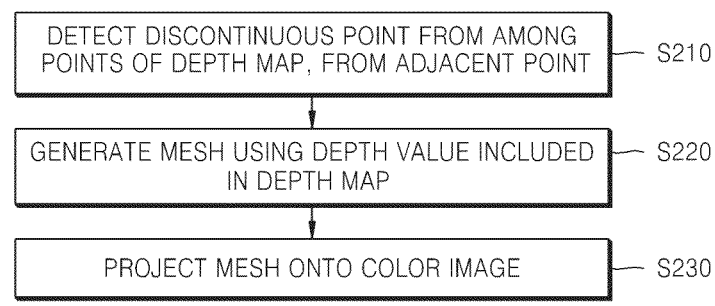
FIG. 4 is a flowchart illustrating an operation of projecting a depth map onto a color image, according to an embodiment.

Referring back to FIG. 1, next, each of a plurality of points included in the depth map may be projected onto the color image in operation S200. FIG. 4 is a flowchart illustrating an operation of projecting a depth map onto a color image, according to an embodiment.

Figure 5:
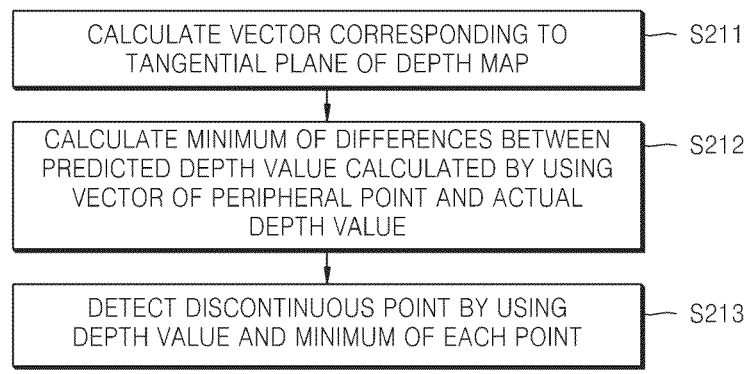
FIG. 5 is a flowchart illustrating an operation of detecting a discontinuous point that is discontinuous from an adjacent point, from among points of a depth map, according to an embodiment.

Referring to FIG. 4, according to operation S200, first, a depth value of each of a plurality of first points and depth values of second points adjacent to the first point of the depth map may be used to detect a discontinuous point that is discontinuous from the second points, from among the first points, in operation S210. FIG. 5 is a flowchart illustrating an operation of detecting a discontinuous point of a depth map that is discontinuous from adjacent points, according to an embodiment.

Referring to FIG. 5, according to operation S210 of detecting a discontinuous point of a depth map that is discontinuous from an adjacent point, first, with respect to each of the first points of the depth map, a vector corresponding to a tangential plane of each of the first points may be calculated in operation S211.

According to the current embodiment, discontinuity between adjacent first points in a depth map may be determined by using a preset threshold value. When it is assumed that a normal direction of a continuous surface of an object is at an angle greater than a predetermined reference angle with respect to a viewing direction of a depth sensor, a depth value of each of the adjacent, first points may be greater than the threshold value. Thus, the first points may be determined as having discontinuity even though a surface of an object is continuous. Accordingly, when a vector corresponding to a tangential plane of a first point is calculated and used as in the current embodiment, a factor regarding a normal direction with respect to the surface of the object is considered, and thus, an error as described above may be prevented.

According to the current embodiment, depth values of points included in a 3*3 area around one predetermined first point may be used to calculate a vector corresponding to a tangential plane of the one predetermined first point. For example, a depth value du of a first point u may be expressed as in Equation 1 below.

$$du = ax + by + c = (x, y, 1)\begin{pmatrix} a \\ b \\ c \end{pmatrix} = (x, y, 1) \cdot l \quad \text{[Equation 1]}$$

Accordingly, according to the current embodiment, a vector $l$ satisfying Equation 1 above may be calculated by using a position vector (x, y) of each point included in the 3*3 area and the depth value of each point. By repeating the above operation with respect to all points included in the depth map, a vector as described above may be calculated for each of the points.

Figure 6:
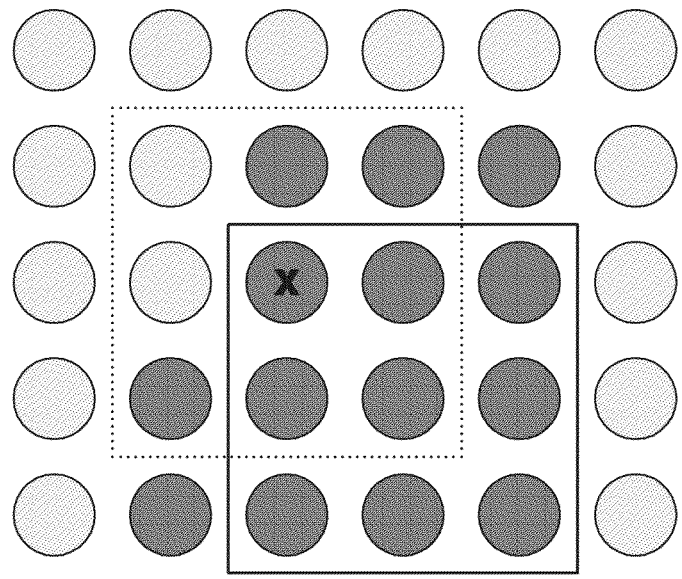
FIG. 6 is a reference diagram illustrating a process of calculating a predicted depth value of a predetermined point by using a vector of a peripheral point, according to an embodiment.

Next, in operation S212, a minimum value from among difference values between a predicted depth value of the first points, which is calculated by using the vector of at least one third point included in a predetermined area around the first points, and a depth value of the first points included in the depth map may be calculated. FIG. 6 is a reference diagram illustrating a process of calculating a predicted depth value of a predetermined point by using a vector of a peripheral point, according to an embodiment.

As illustrated in FIG. 6, with respect to each of points included in a 3*3 area around a predetermined first point, a predicted depth value of the predetermined first point may be calculated by using the above-calculated vector. That is, eight predicted depth values with respect to the first point may be calculated by using eight third points, except the first point, from among the points included in the above area. The predicted depth values may be calculated by calculating a dot product of a vector corresponding to a position of the first point and the above-calculated vector with respect to the third points.

Also, a difference between the calculated predicted depth value and an actual depth value of the first point included in the depth map may be calculated. Referring to FIG. 6, since a total of eight predicted depth values may be calculated, a total of eight differences may be calculated. Also, a minimum value of the calculated differences may be calculated. By repeating the above-operation with respect to all points included in the depth map, the minimum value may be calculated for each of the points.

According to the above description, the minimum value lu corresponding to a first point u may be expressed as in Equation 2 below.

$$l_u = \min_{u' \in N_u} (|d_u - (u, 1) \cdot l_{u'}|) \quad \text{[Equation 2]}$$

In Equation 2, $N_u$ is a set including a third point u' included in an area of a predetermined size around the first point u. In Equation 2, a vector u is a position vector of the first point u. Also, in Equation 2, $d_u$ denotes a depth value of the first point u included in the depth map. Also, $l_{u'}$ denotes a vector corresponding to a tangential plane of the third point u'.

Next, in operation S213, a discontinuous point that is discontinuous from the second point, among the first points, may be detected by using the depth value of the first points, the depth value of the second point, the minimum value of the first points, and the minimum value of the second points.

For example, the smaller a difference between the depth value of the first point and the depth value of the second point, the higher a probability that the first point and the second point are continuous. Accordingly, discontinuity may be determined by comparing a difference between the depth value of the first point and the depth value of the second point with the threshold value.

Also, discontinuity may be determined based on a result of determining whether a first object corresponding to the first point and a second object corresponding to the second point are identical, from among at least one object existing within the scene. Whether the first object and the second object are identical or not may be determined as follows.

The smaller a difference between a predicted value depth of the first points that is calculated by using a vector corresponding to a tangential plane of the second point and an actual depth value of the first point included in the depth map, the higher may be a probability of discontinuity. Also, the smaller a difference between a predicted value depth of the second point that is calculated by using a vector corresponding to a tangential plane of the first point and an actual depth value of the second point included in the depth map, the higher a probability of discontinuity.

Accordingly, discontinuity may be determined by comparing the difference with a threshold value. The predicted depth value of the first point or the second point may be calculated by calculating a dot product of a vector corresponding to a position of the second point and the minimum value calculated above with respect to the second point or the first point.

According to the above description, to determine discontinuity between the first point u and the second point u' adjacent to the first point u, a discontinuity index e as expressed in Equation 3 below may be calculated. By comparing the discontinuity index e with a preset threshold value, when the discontinuity index e is greater than or equal to the threshold value, it may be determined that the first point u and the second point u' have discontinuity.

$$e = \min(|d_u - D_{u'}|, \max(|d_u - (u,1) \cdot l_{u'}|, |d_{u'} - (u',1) \cdot l_u|))$$

In Equation 3, $d_u$ is a depth value of a first point u, and du' is a depth value of a second point u'. A vector u is a position vector of the first point u, and a vector u' is a position vector of the second point u'. A vector lu' is the minimum value calculated above with respect to the second point u', and a vector lu is the minimum value calculated above with respect to the first point u.

Figure 7:
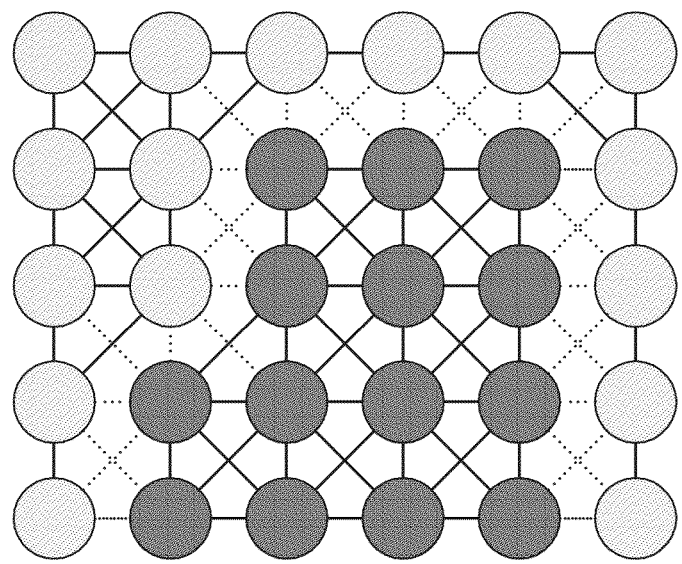
FIG. 7 is a conceptual diagram illustrating a result of detecting a discontinuous point that is discontinuous from an adjacent point, from among points of a depth map, according to an embodiment.

FIG. 7 is a conceptual diagram illustrating a result of detecting a discontinuous point that is discontinuous from an adjacent point, from among points of a depth map, according to an embodiment. Referring to FIG. 7, when two adjacent points have discontinuity, an edge connecting the two points is expressed by a dotted line. Also, when two adjacent points have continuity, the edge connecting the two points is expressed by a solid line. Referring to FIG. 7, black points may have discontinuity with respect to grey points. Accordingly, the black points and the grey points may be different objects.

Figure 8:
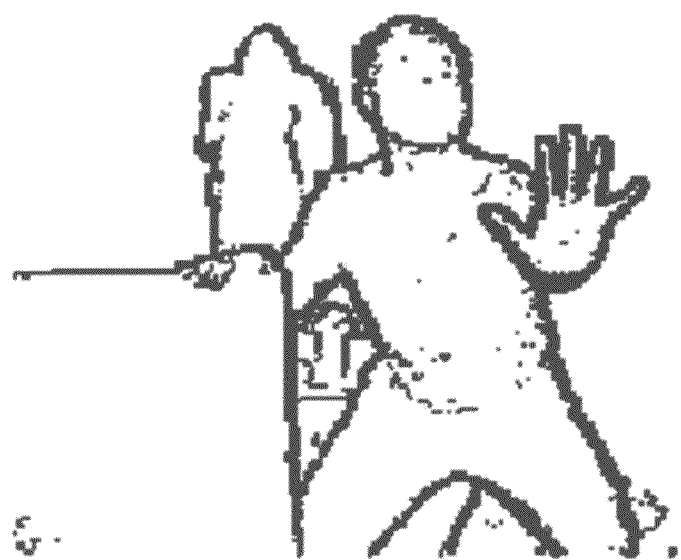
FIG. 8 is a visual image illustrating a result of detecting a discontinuous point that is discontinuous from an adjacent point, from among points of a depth map, according to an embodiment.

FIG. 8 is a visual image illustrating a result of detecting a discontinuous point that is discontinuous from an adjacent point, from among points of a depth map, according to an embodiment. Referring to FIG. 8, a set of discontinuous points may indicate a boundary of an object included in a scene.

Figure 9:
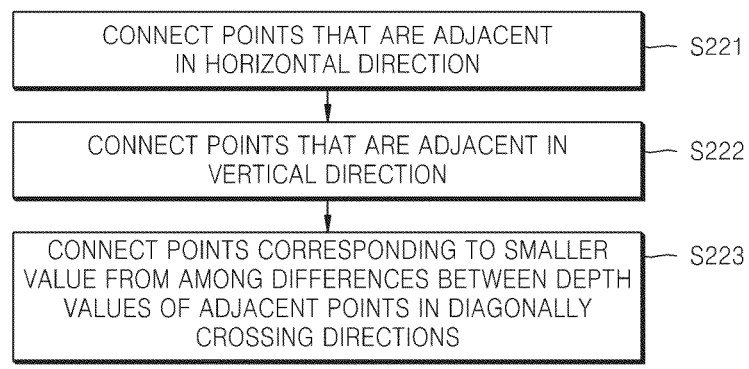
FIG. 9 is a flowchart illustrating an operation of generating a mesh according to an embodiment

Referring to FIG. 4, next, in operation S220, a mesh may be generated by using a difference between a depth value of the first point and a depth value of the second point and the first point. FIG. 9 is a flowchart illustrating an operation of generating a mesh according to an embodiment.

Referring to FIG. 9, according to operation S220, first, a fourth point that is adjacent to the first point in a horizontal direction may be connected to the first point in operation S221. Next, a fifth point that is adjacent to the first point in a vertical direction may be connected to the first point in operation S222.

Figure 10:
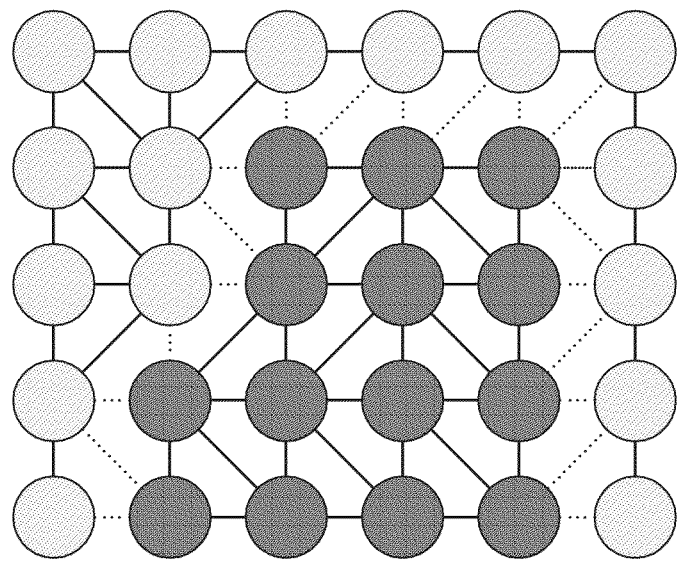
FIG. 10 is a conceptual diagram illustrating meshes generated according to an embodiment.

Next, in operation S223, points that correspond to a smaller value from among a difference between the depth value of the fourth point and the depth value of the fifth point and a difference between the depth value of a sixth point that is adjacent to the fourth point in a vertical direction and to the fifth point in a horizontal direction, and the depth value of the first point, may be connected. That is, four points that form a square may be divided into a set of two pairs of points along a diagonal direction. From among the two pairs of the points, a pair of points, a difference in the depth values of which is smaller, may be connected, and the other pair of points may not be connected. FIG. 10 is a conceptual diagram illustrating meshes generated according to an embodiment.

Referring to FIG. 4 again, in operation S230, the mesh may be projected onto the color image. The depth sensor and the color camera may have been calibrated with respect to each other. In other words, mapping information regarding which point of a depth map sensed by using a depth sensor corresponds to which point of a color image captured by using the color camera may be previously stored. Accordingly, the mesh may be projected onto the color image by referring to the mapping information.

Figure 11:
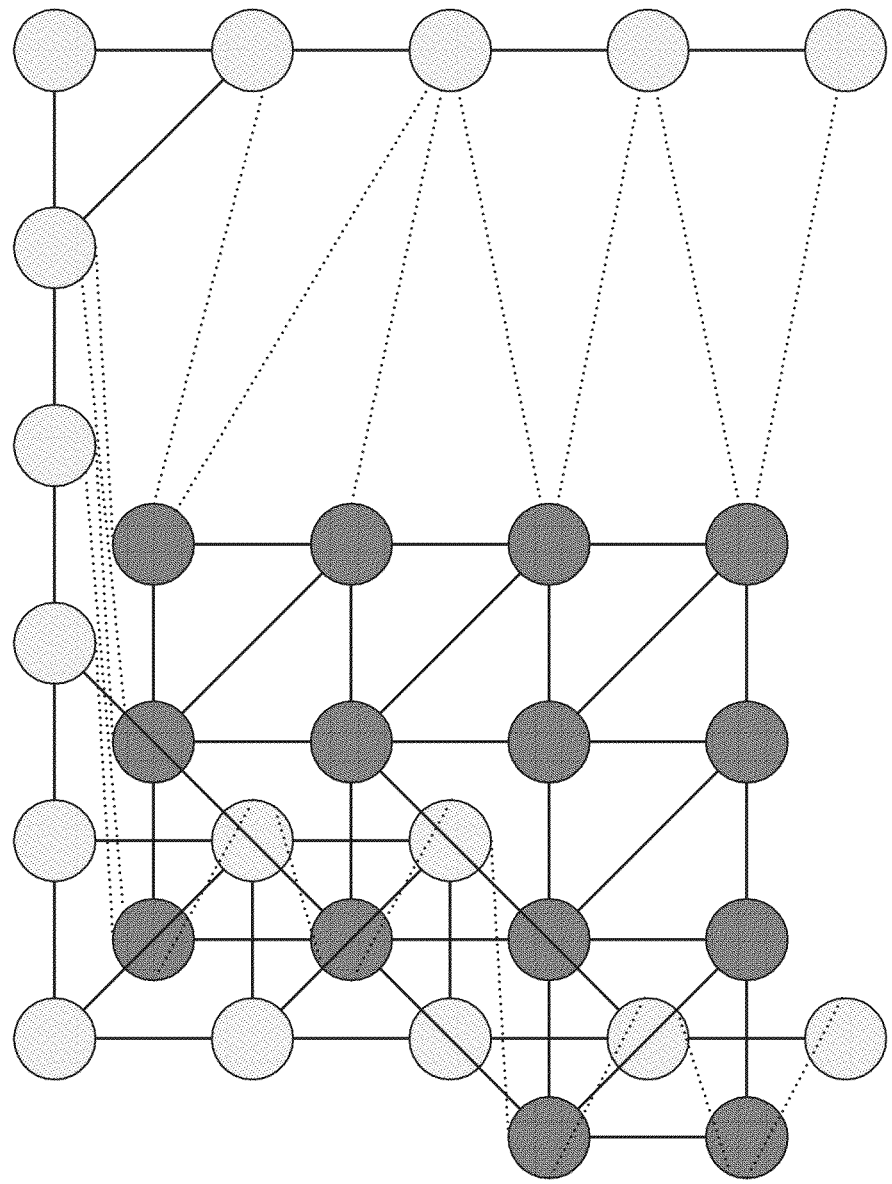
FIG. 11 is a conceptual diagram illustrating meshes projected onto a color image, according to an embodiment.
Figure 12:
FIG. 12 is a visual image illustrating meshes projected onto a color image, according to an embodiment.

FIG. 11 is a conceptual diagram illustrating meshes projected onto a color image, according to an embodiment. As shown on the left side of FIG. 11, some of vertexes of the meshes may overlap due to a difference in time points between the depth sensor and the color image. In contrast, as shown on the right side of FIG. 11, there may be a portion where a vertex density is relatively low compared to other portions. FIG. 12 is a visual image illustrating meshes projected onto a color image, according to an embodiment.

Figure 13:
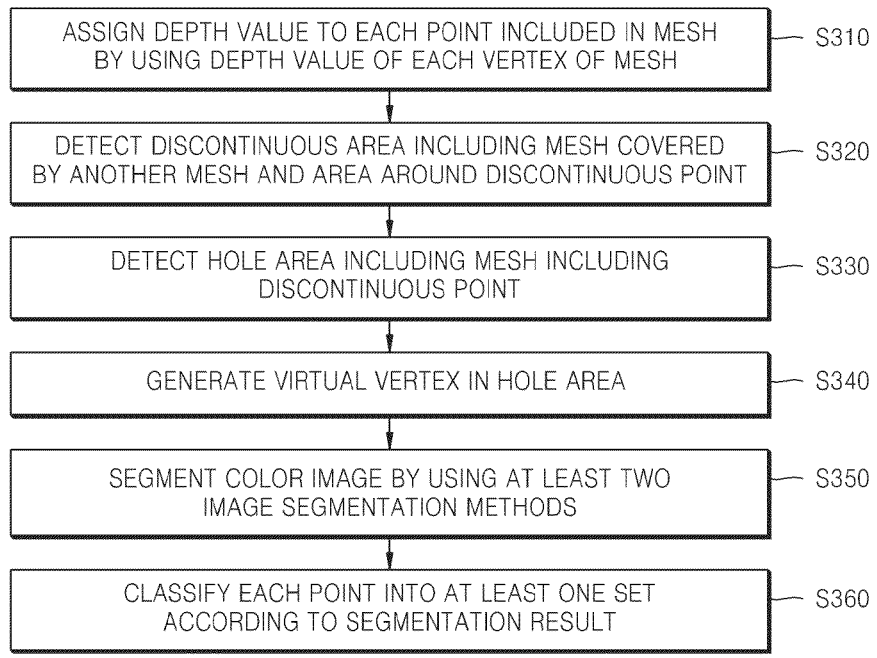
FIG. 13 is a flowchart illustrating an operation of segmenting a color image by using at least two methods and classifying each of points of the color image into at least one set according to a result of segmentation, according to an embodiment.

Referring to FIG. 1 again, next, in operation S300, a segmentation result may be generated by using at least two image segmentation methods regarding the color image onto which the depth map is projected, and points included in the color image may be classified into at least one set based on each of the segmentation results. FIG. 13 is a flowchart illustrating an operation of segmenting a color image by using at least two methods and classifying each of points of the color image into at least one set according to a result of segmentation, according to an embodiment.

Figure 14:
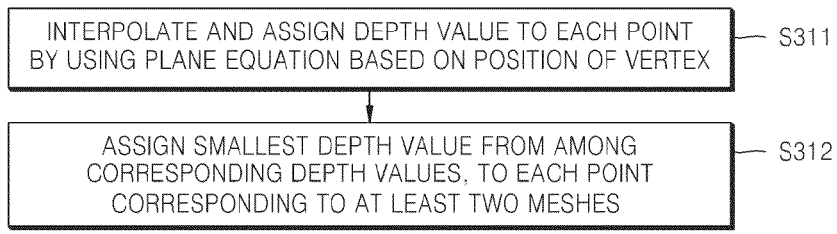
FIG. 14 is a flowchart illustrating an operation of assigning a depth value to each point included in a mesh, by using a depth value of each vertex of the mesh, according to an embodiment.

Referring to FIG. 13, according to operation S300, first, a depth value of each of points included in the projected mesh may be performed by using the depth value of each of vertexes of the projected mesh in operation S310. FIG. 14 is a flowchart illustrating an operation of assigning a depth value to each point included in a mesh, by using a depth value of each vertex of the mesh, according to an embodiment.

Referring to FIG. 14, according to S310, first, the depth value may be interpolated and assigned to each point included in the projected mesh by using a plane equation based on positions of vertexes in operation S311. Each mesh may have a triangular shape. Accordingly, a plane equation may be calculated based on a position and a depth value of three vertexes included in the mesh. A depth value may be set for each point in the mesh by using the plane equation.

Next, in operation S312, a smallest depth value from among the depth values corresponding to the points may be assigned to a point corresponding to at least two of the meshes from among points included in the color image. For example, like the points included on the left side of FIG. 11, some points may overlap with at least two meshes. In this case, according to a typical Z-buffering method, a smallest depth value from among corresponding depth values may be assigned to each of the points. In other words, at least a portion of a mesh may be covered by another mesh.

Figure 15:
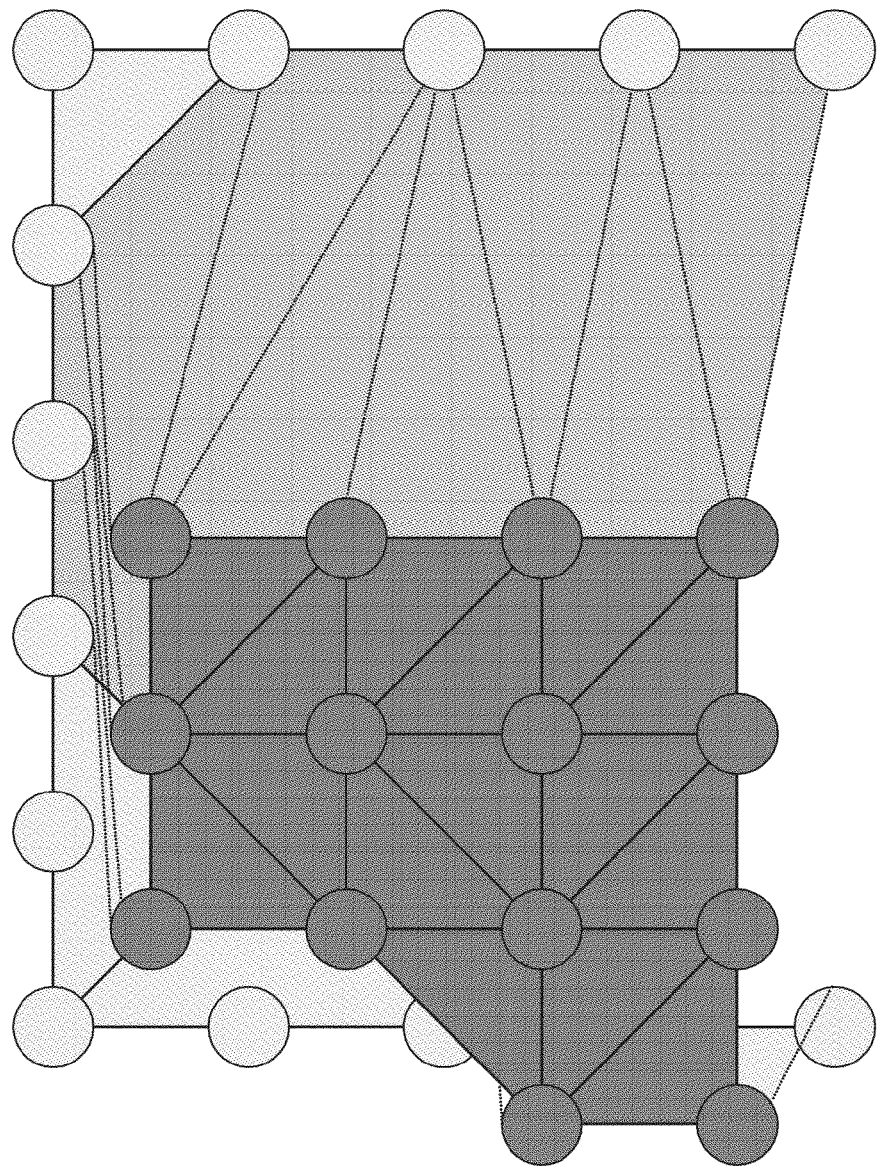
FIG. 15 is a conceptual diagram illustrating a result of assigning a depth value to each point included in meshes, according to an embodiment.

FIG. 15 is a conceptual diagram illustrating a depth value assigned to each point included in a mesh, according to an embodiment. Referring to FIG. 15, at least a portion of the projected mesh of FIG. 11 is covered by using a Z-buffering method. Referring to FIG. 15, a depth value corresponding to a mesh of a black portion may be smaller than a depth value corresponding to a mesh of a grey portion.

Referring to FIG. 13 again, in operation S320, a discontinuous area including at least one mesh including at least one vertex covered by another mesh from among the meshes projected onto the color image and an area of a predetermined range around the discontinuous point may be detected. When at least one of three vertexes included in a mesh is covered by another mesh, an area in the mesh may be determined as a discontinuous area. In addition, the area of a predetermined range around the discontinuous point detected in operation S210 may be determined as a discontinuous area.

Figure 16:
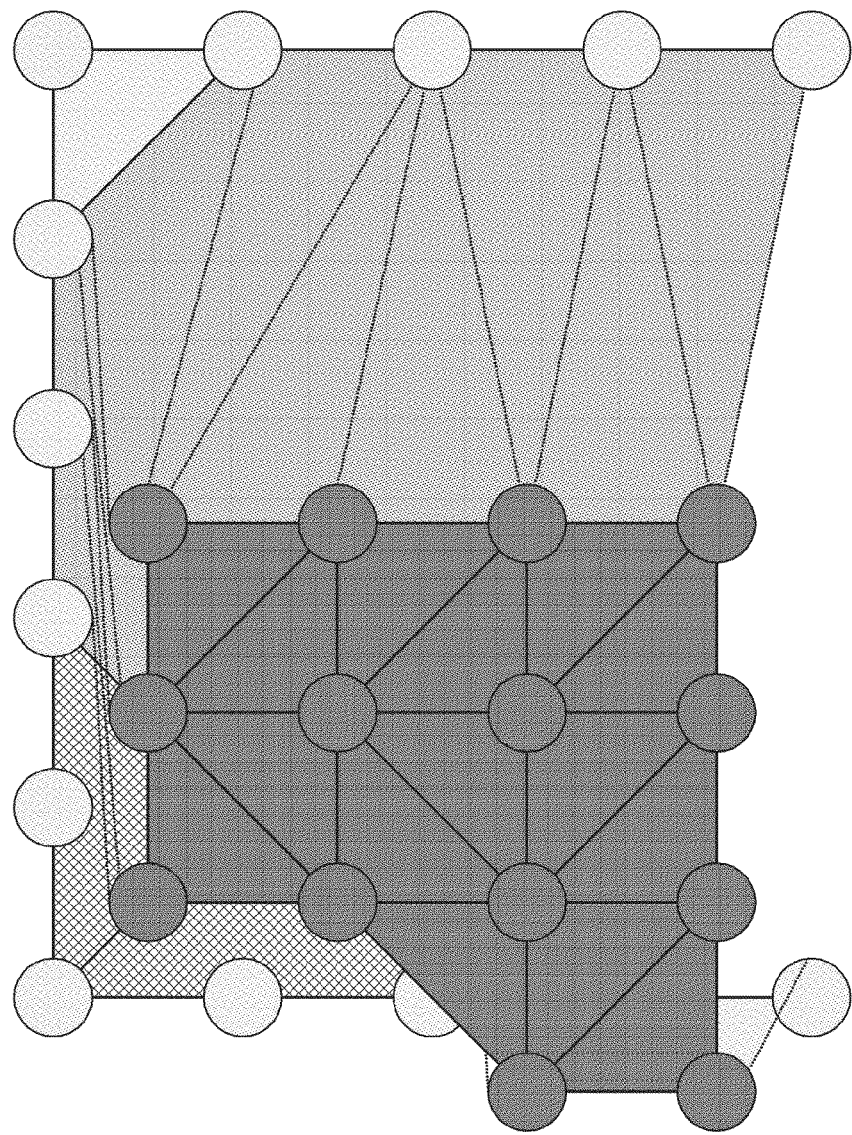
FIG. 16 illustrates a result of detecting a discontinuous area according to an embodiment.

FIG. 16 illustrates a result of detecting a discontinuous area according to an embodiment. Referring to FIG. 16, a lattice pattern is filled in the area detected as a discontinuous area.

Figure 17:
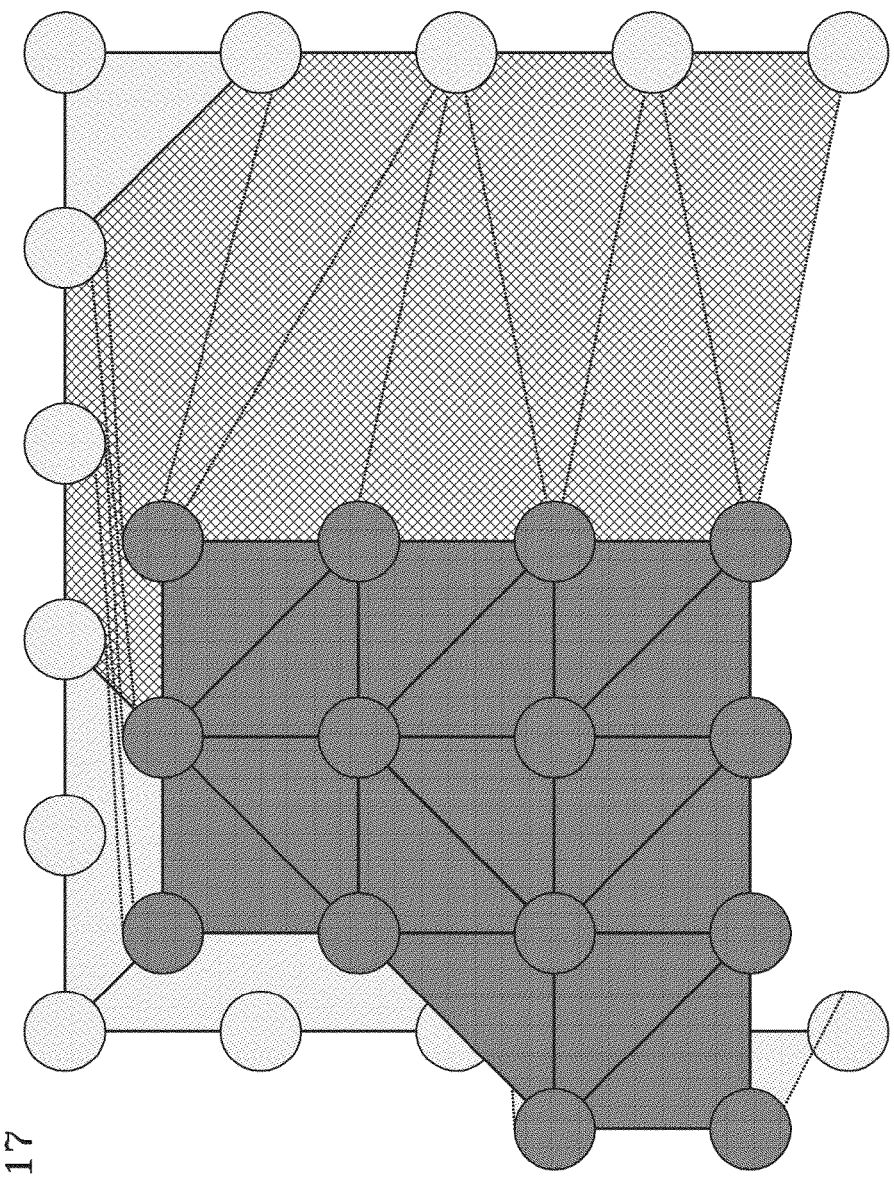
FIG. 17 is a conceptual diagram illustrating a result of detecting a hole area according to an embodiment.
Figure 18:
FIG. 18 is a visual image illustrating a result of detecting a discontinuous area and a hole area according to an embodiment.

Referring to FIG. 13 again, next, a hole area including at least one mesh including the at least one discontinuous point from among the projected mesh may be detected in operation S330. FIG. 17 is a conceptual diagram illustrating a result of detecting a hole area, according to an embodiment. Referring to FIG. 17, a lattice pattern is filled in the area detected as a discontinuous area. FIG. 18 is a visual image illustrating a result of detecting a discontinuous area and a hole area according to an embodiment. In FIG. 18, a red area may correspond to a discontinuous area, and a green area may correspond to a hole area.

Figure 19:
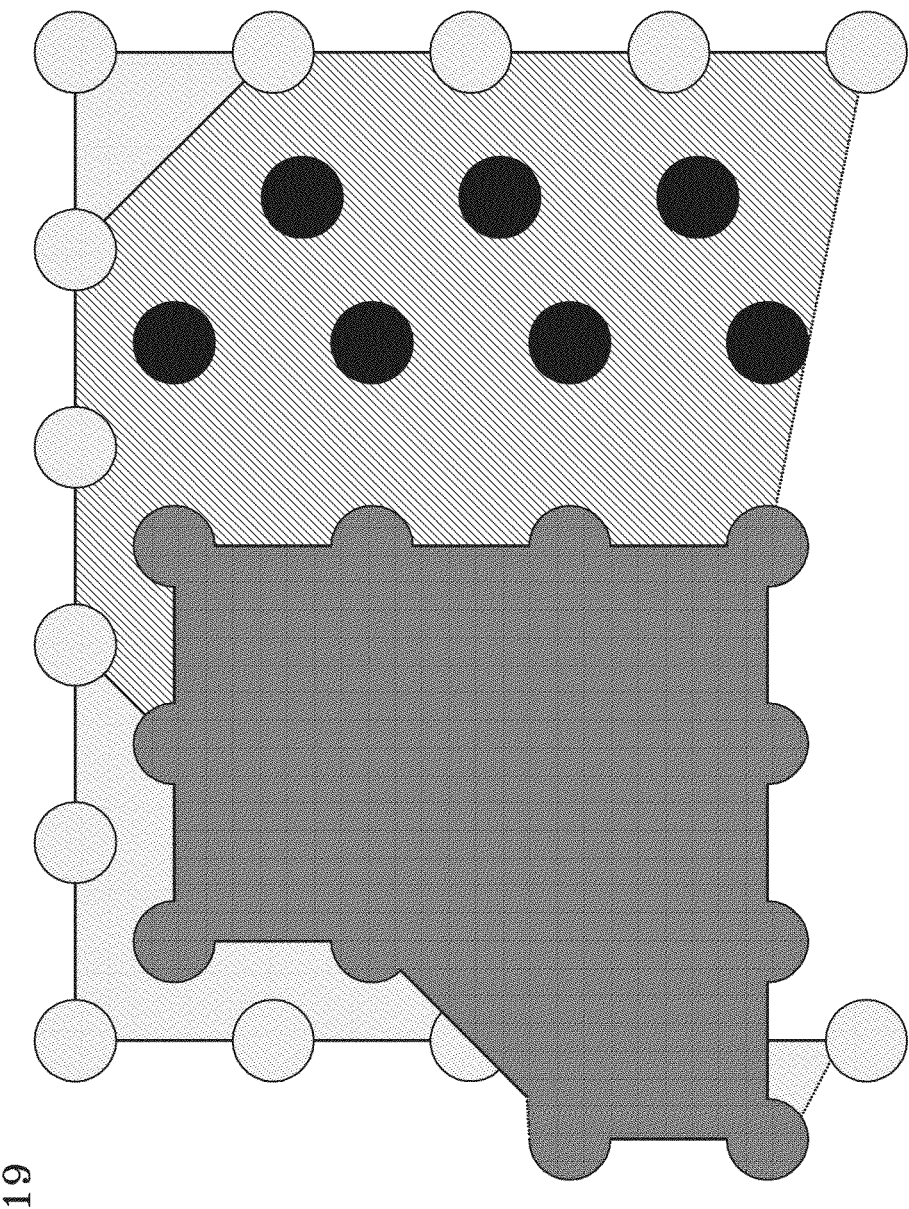
FIG. 19 is a conceptual diagram illustrating a result of generating a virtual vertex in a hole area, according to an embodiment.

Referring to FIG. 13 again, next, at least one virtual vertex may be generated in the hole area in operation S340. FIG. 19 is a conceptual diagram illustrating a result of generating a virtual vertex in a hole area, according to an embodiment.

Referring to FIG. 19, a black virtual vertex is illustrated on the right side of FIG. 19 which is the hole area.

Referring to FIG. 13, next, the color image onto which the depth map is projected may be segmented by using at least two image segmentation methods in operation S350. It may be regarded that a predetermined type of an image segmentation method does not always exhibit better performance. According to the current embodiment, a boundary of an object at a high resolution may be accurately detected by using at least two image segmentation methods.

Figure 20:
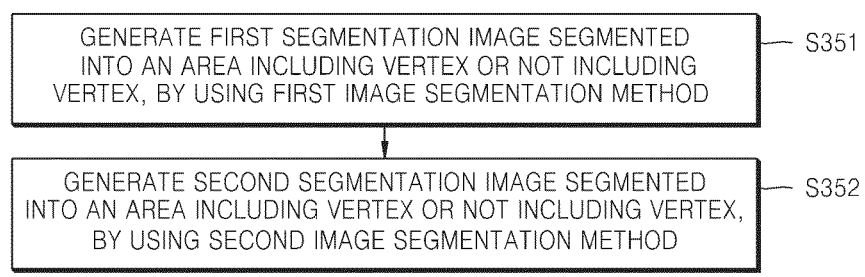
FIG. 20 is a flowchart illustrating an operation of segmenting a color image by using at least two image segmentation methods, according to an embodiment.

FIG. 20 is a flowchart illustrating an operation of segmenting a color image by using at least two image segmentation methods, according to an embodiment. Referring to FIG. 20, according to operation S350, first, a first segmentation image, which is an image obtained by segmenting the color image onto which the mesh is projected, into at least one area that includes either one of the vertexes or one of the virtual vertexes or into at least one area that does not include any of the vertexes nor any of the virtual vertexes, by using a first image segmentation method in operation S351. That is, in a segmented area, only one vertex or only one virtual vertex may be included, or neither of the vertex nor the virtual vertex may be included.

For example, the first image segmentation method may be a simple linear iterative clustering (SLIC) image segmentation method. According to this method, a color image may be segmented such that each of the points included in the color image are included in the same area as a nearest vertex to the point. A distance between the point and the nearest vertex may be a sum of a square of a difference in color between the points and the vertex and a square of a difference in position between the points and the vertex, wherein weights are respectively applied to the squares.

Figure 21:
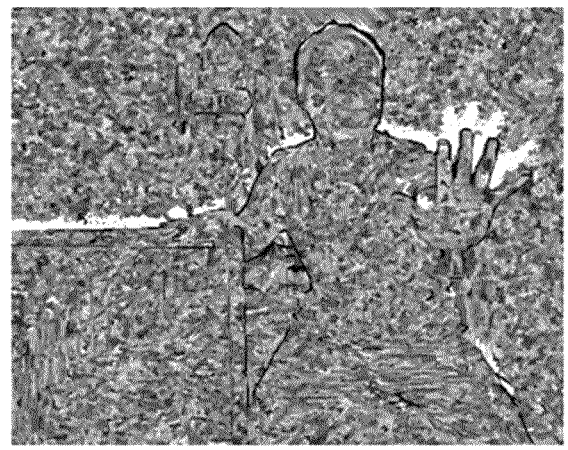
FIG. 21 is a visual image illustrating a result of segmenting a color image by using a first image segmentation method according to an embodiment.

Here, a second point that is included in a different area from the vertex may be present between the first point and a nearest vertex thereto so that the first point and the vertex may not be physically connected. In this case, the first point may be defined as being in an area that does not include the vertex or the virtual vertex. FIG. 21 is a visual image illustrating a result of segmenting a color image by using a first image segmentation method according to an embodiment.

Referring to FIG. 20 again, next, a second segmentation image, which is an image obtained by segmenting the color image, onto which the mesh is projected, into at least one area that includes either one of the vertexes or one of the virtual vertexes, or into at least one area that does not include any of the vertexes or the virtual vertexes, may be generated by using a second image segmentation method that is different from the first image segmentation method in operation S352.

The second image segmentation method may be an Efficient Graph-Based (EGB) image segmentation method. According to this method, when color differences regarding all adjacent points are smaller than a threshold value, the points may be connected and included in the same area. The threshold value may be inversely proportional to a size of the area formed by connecting the points. That is, the larger the area, the smaller the threshold value, and thus, a probability that a new point may be included in the same area may gradually decrease.

Figure 22:
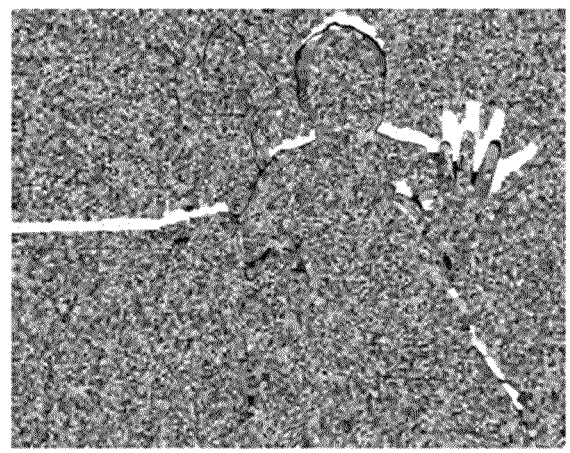
FIG. 22 is a visual image illustrating a result of segmenting a color image by using a second image segmentation method according to an embodiment.

When one of two points is a vertex or one of two points is included in an area where the vertex is included, a label of an area formed by connecting the two points may be substituted by a label of the vertex. When two points are both vertexes or are included in an area in which the vertexes are included, the two points do not have to be connected. FIG. 22 is a visual image illustrating a result of segmenting a color image by using a second image segmentation method according to an embodiment.

Figure 23:
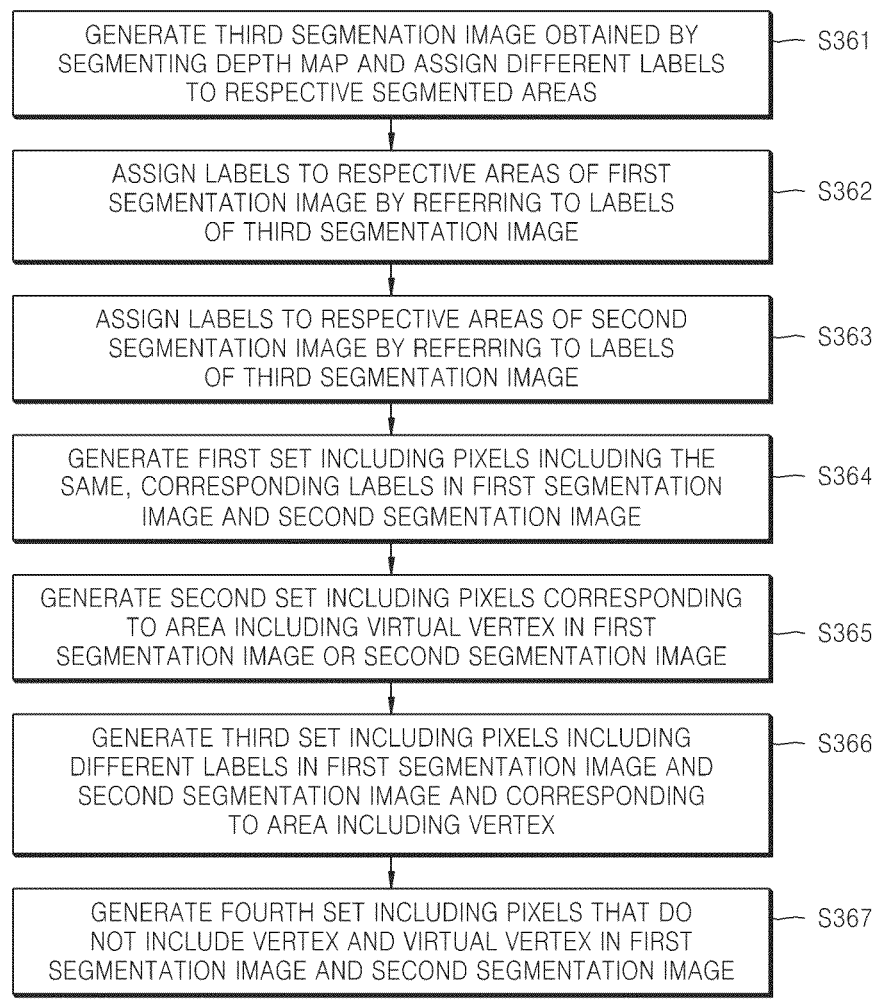
FIG. 23 is a flowchart illustrating an operation of classifying each point of a color image into at least one set, according to an embodiment.

Referring to FIG. 13 again, each point may be classified into at least one set based on the segmentation result in operation S360. FIG. 23 is a flowchart illustrating an operation of classifying each point of a color image into at least one set, according to an embodiment.

Referring to FIG. 23, according to operation S360, first, a third segmentation image obtained by segmenting an image of the depth map into at least one area may be generated and different labels may be assigned to respective regions included in the third segmentation image in operation S361.

Figure 24:
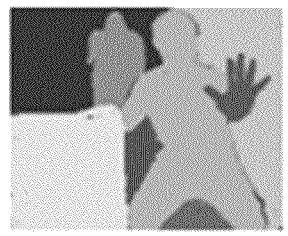
FIG. 24 is a visual image illustrating a segmentation image obtained by segmenting a depth map according to an embodiment.

A depth map may be image-segmented by using a Watershed method or an EGB image segmentation method. Also, different labels may be assigned to the segmented respective areas. FIG. 24 is a visual image illustrating a segment image obtained by segmenting a depth map according to an embodiment. Referring to FIG. 24, the areas having different labels are illustrated in different colors.

Referring to FIG. 23 again, next, in operation S362, a label corresponding to the label assigned to the areas of the third segmentation image corresponding to the vertexes included in the respective regions included in the first segmentation image may be assigned to the respective regions included in the first segmentation image.

Figure 25:
FIG. 25 is a visual image illustrating a result of assigning a label to each segmented area segmented by using a first image segmentation method, according to an embodiment.

FIG. 25 is a visual image illustrating a result of assigning a label to each segmented area segmented by using a first image segmentation method, according to an embodiment. Referring to FIG. 25, the areas having different labels are illustrated in different colors. Referring to FIG. 25, a considerable number of areas of FIG. 21 are combined.

Referring to FIG. 23 again, next, in operation S362, a label corresponding to the label assigned to the areas of the third segmentation image corresponding to the vertexes included in the respective regions included in the second segmentation image may be assigned to the respective regions included in the second segmentation image.

Figure 26:
FIG. 26 is a visual image illustrating a result of assigning a label to each segmented area segmented by using a second image segmentation method, according to an embodiment.

FIG. 26 is a visual image illustrating a result of assigning a label to each segmented area segmented by using a second image segmentation method, according to an embodiment. Referring to FIG. 26, the areas having different labels are illustrated in different colors. Referring to FIG. 26, a considerable number of areas of FIG. 22 are combined.

Referring to FIG. 23 again, from among the first pixels included in the first segmentation image, a first set including at least one of the first pixels may be generated in operation S364. The label of each of the first pixels included in the first set may be the same as the label corresponding to the second pixel of the second segmentation image.

Next, from among the first pixels included in the first segmentation image, a second set including the first pixel, the label of which is the same as the label corresponding to the second pixel of the second segmentation image, may be generated in operation S365. In other words, the second set may include a pixel that has been included in the hole area.

Next, from among the first pixels, a third set including the at least one first pixel, the label of which is different from the label corresponding to the first pixel corresponding to the second pixel, and whose area corresponding to the first pixel or corresponding to the second pixel corresponding to the first pixel includes the at least one vertex, may be generated in operation S366. In other words, the third set may include pixels regarding which results are different based on the first image segmentation method and the second image segmentation method.

Next, from among the first pixels, a fourth set including the at least one first pixel in which the area corresponding to the first pixel and the area corresponding to the second pixel corresponding to the first pixel do not include the vertex and the virtual vertex may be generated in operation S367. In other words, the fourth set may include pixels that are not in an area that includes a vertex or a virtual vertex.

As described above, as a second point that is included in an area that is different from an area where the vertex is included, is present between a predetermined first point and a vertex that is nearest to the first point, the first point and the vertex may not be physically connected. In this case, the first vertex may be defined as being in an area where neither a vertex nor a virtual vertex is included. The fourth set may include the first point.

Figure 27:
FIG. 27 is a visual image illustrating a result of classifying each of points of a color image into at least one set, according to an embodiment.

FIG. 27 is a visual image illustrating a result of classifying each point of a color image into at least one set, according to an embodiment. Referring to FIG. 27, pixels included in the first set are illustrated in grey, and pixels included in the second set are illustrated in white. Also, pixels included in the third set are illustrated in green, and pixels included in the fourth set are illustrated in red.

Figure 28:
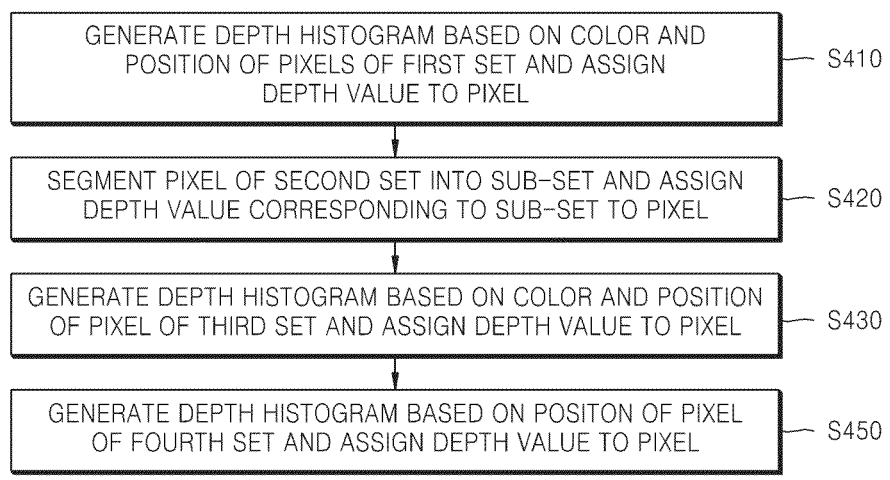
FIG. 28 is a flowchart illustrating an operation of assigning a depth value to a point included in a set according to an embodiment.

Referring to FIG. 1 again, a depth value may be assigned to a point of the color image included in the set in operation S400. FIG. 28 is a flowchart illustrating an operation of assigning a depth value to a point included in a set according to an embodiment.

Referring to FIG. 28, according to operation S400, first, a depth histogram may be set based on a color and a position of a pixel of the first set and a depth value may be set to a pixel in operation S410.

Figure 29:
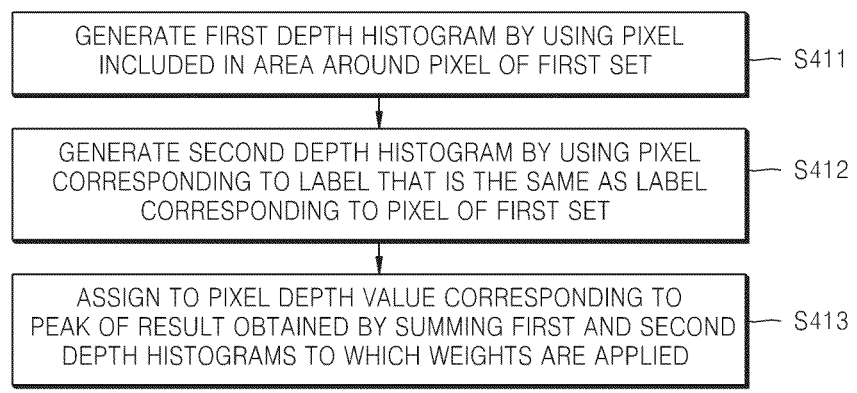
FIG. 29 is a flowchart illustrating an operation of generating a depth histogram for a pixel of a first set and assigning a depth value to the pixel, according to an embodiment.

FIG. 29 is a flowchart illustrating an operation of generating a depth histogram for a pixel of a first set and assigning a depth value to the pixel, according to an embodiment. Referring to FIG. 29, first, a first depth histogram may be generated for each of third pixels included in the first set in operation S411.

The first depth histogram may be generated by using the depth value of at least one fourth pixel that is included in an area of a predetermined range around the third pixel and to which the depth value is assigned, a position difference between the third pixel and the fourth pixel, and a color difference between the third pixel and the fourth pixel. For example, the first depth histogram may be generated by using Equation 4 below.

$$h_x^{WMF}(d) = \sum_{x' \in W(x)} G_I(I_x - I_{x'})G_x(x - x')G_d(d - d') \quad \text{[Equation 4]}$$

In Equation 4, G denotes a Gaussian weight function. Ix denotes a color of a pixel x. x' denotes a pixel to which a depth value is assigned, from among pixels included in an area W(x) of a predetermined range around x. d' denotes a depth value of the pixel to which the depth value is assigned.

Next, a second histogram may be generated by using the depth value of at least one fifth pixel corresponding to the same label as a label corresponding to the third pixel, a position difference between the third pixel and the fifth pixel, and a color difference between the third pixel and the fifth pixel in operation S412. For example, the second depth histogram may be generated by using Equation 5 below.

$$h_{x|R(x)}(d) = \sum_{x' \in W(x) \cap R(x)} G_I(I_x - I_{x'})G_x(x - x')G_d(d - d') \quad \text{[Equation 5]}$$

In Equation 5, R(x) is a set of pixels that are segmented by using the above-described image segmentation methods and are included in an area including a pixel x.

Next, the depth value corresponding to a peak of a result of summing the first and second histograms, to which weights are respectively applied, may be set as a depth value of the third pixel in operation S413. The result of summing the first and second histograms, to which weights are respectively applied, may be expressed as in Equation 6 below.

$$h_x = h_x^{WMF} + \alpha \sum_k h_{x|R^{(k)}(x)} \quad \text{[Equation 6]}$$

Referring to FIG. 28 again, next, sixth pixels included in the second set may be selected based on colors of the sixth pixels and positions thereof, and may be segmented into at least one sub-set that includes a seventh pixel to which the depth value is assigned, and as the depth value of the sixth pixels, a depth value of the seventh pixel included in the sub-set in which the sixth pixels are included may be set in operation S420.

Figure 30:
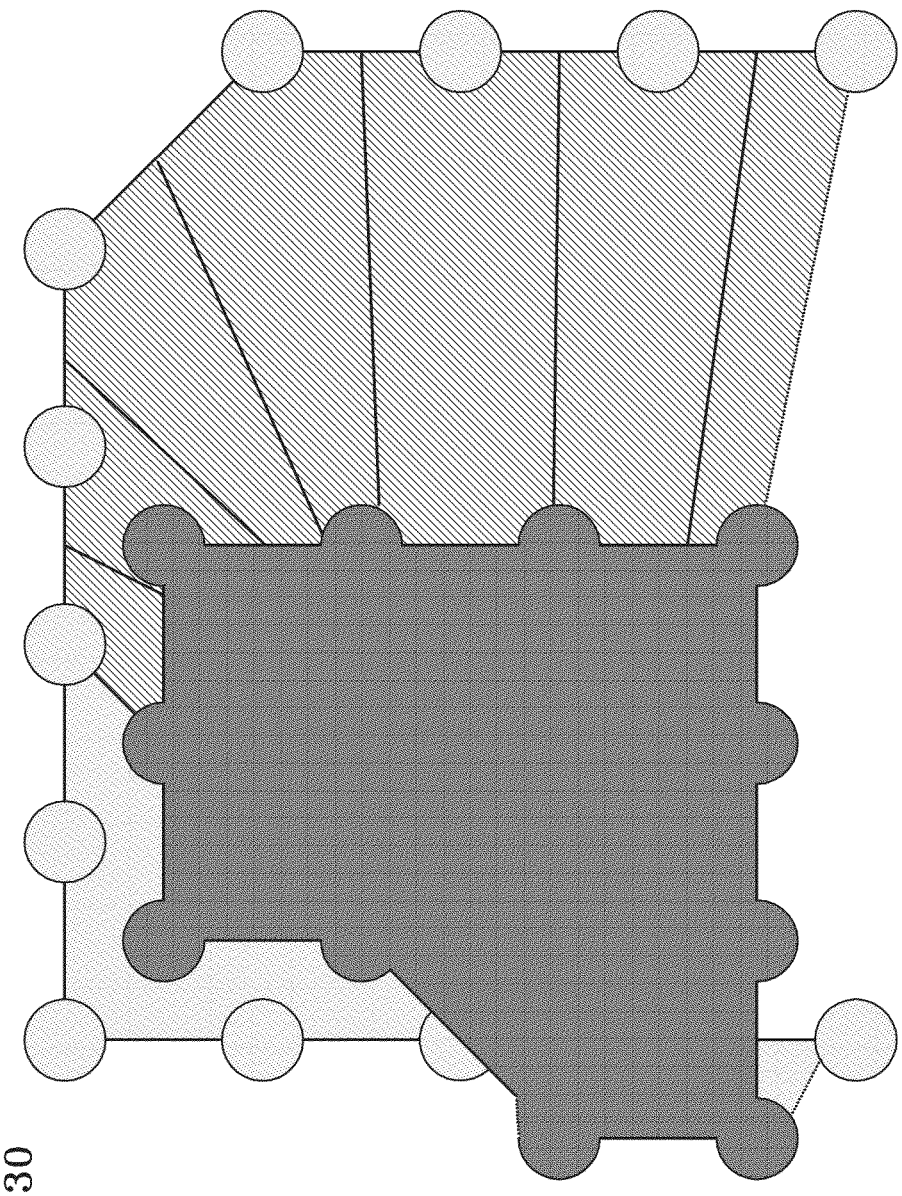
FIG. 30 is a conceptual diagram illustrating a result of segmenting a pixel of a second set into a sub-set, according to an embodiment.
Figure 31:
FIG. 31 is a visual image illustrating a result of assigning a depth value to a pixel of a second set, according to an embodiment.

FIG. 30 is a conceptual diagram illustrating a result of segmenting a pixel of a second set into sub-sets, according to an embodiment. A depth value is assigned to some of pixels around the hole area. Accordingly, the second set may be segmented into sub-sets by using a Watershed algorithm or an EGB image segmentation method. Accordingly, all pixels included in the hole area may be included in the same area as a vertex. Also, as depth values of the pixels included in the sub-sets, a depth value of the new vertex may be set. FIG. 31 is a visual image illustrating a result of assigning a depth value to a pixel of a second set, according to an embodiment.

Figure 32:
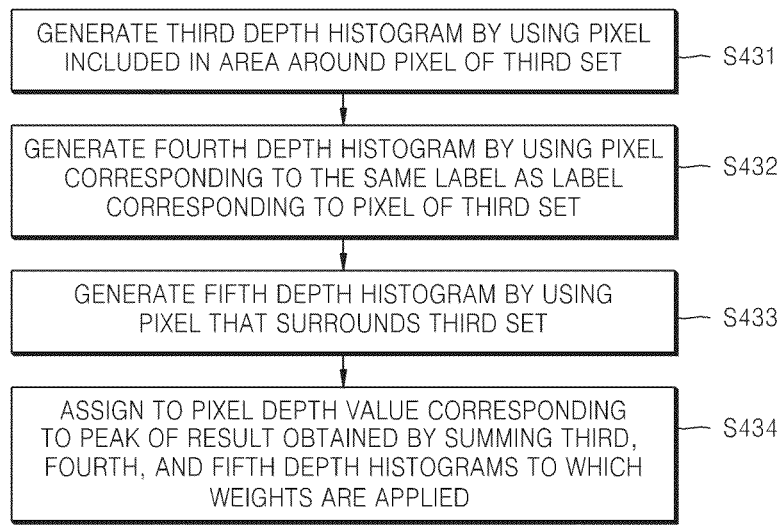
FIG. 32 is a flowchart illustrating an operation of generating a depth histogram for a pixel of a third set and assigning a depth value to the pixel, according to an embodiment.

Referring to FIG. 28 again, next, a depth histogram may be generated based on a color and a position of a pixel of the third set and a depth value may be assigned to the pixel in operation S430. FIG. 32 is a flowchart illustrating an operation of generating a depth histogram for a pixel of a third set and setting a depth value to the pixel, according to an embodiment.

Referring to FIG. 32, first, for eighth pixels included in the third set, a third depth histogram may be generated based on the depth value of at least one ninth pixel that is included in an area of a predetermined range around the eighth pixels and to which the depth value is assigned, a position difference between the eighth pixels and the ninth pixel, and a color difference between the eighth pixels and the ninth pixel in operation S431.

Next, a fourth histogram may be generated by using the depth value of at least one tenth pixel corresponding to the same label as a label corresponding to the eighth pixel, a position difference between the eighth pixel and the tenth pixel, and a color difference between the eighth pixel and the tenth pixel in operation S432.

Next, a fifth depth histogram may be generated by using the depth value of at least one eleventh pixel that surrounds the third set and to which the depth value is assigned, a position difference between the eighth pixel and the eleventh pixel, and a color difference between the eighth pixel and the eleventh pixel in operation S433. For example, the fifth depth histogram may be generated by using Equation 7 below.

$$h_{x|SRND}(d) = \sum_{x' \in W(x) \cap SRND} G_I(I_x - I_{x'})G_x(x - x')G_d(d - d')$$ [Equation 7]

In Equation 7 above, SRND denotes a set including pixels that surround the third set and to which the depth value is assigned.

Next, in operation S434, a summed histogram obtained by summing the third, fourth, and fifth depth histograms by applying weights to the third, fourth, and fifth depth histograms may be generated. The summed histogram may be expressed by Equation 8 below.

$$h_x = \gamma h_x^{WMF} + \alpha \sum_k h_{x|R^{(k)}(x)} + \beta h_{x|SRND}$$ [Equation 8]

Figure 33:
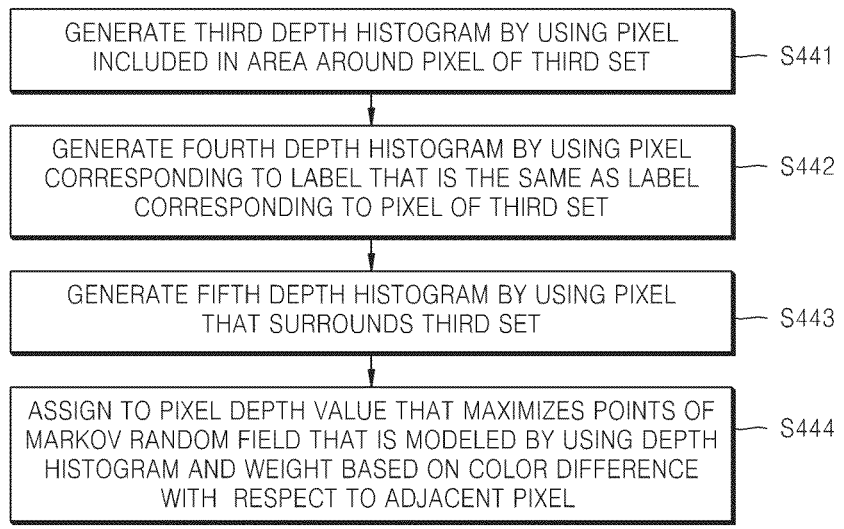
FIG. 33 is a flowchart illustrating an operation of generating a depth histogram for a pixel of a third set and assigning a depth value to the pixel, according to another embodiment.

FIG. 33 is a flowchart illustrating an operation of generating a depth histogram for a pixel of a third set and assigning a depth value to the pixel, according to another embodiment.

According to the current embodiment, first, for each of eighth pixels included in the third set, a third depth histogram may be generated based on the depth value of at least one ninth pixel that is included within a predetermined area around the eighth pixel and to which the depth value is assigned, a position difference between the eighth pixel and the ninth pixel, and a color difference between the eighth pixel and the ninth pixel in operation S441.

Next, a fourth depth histogram may be generated by using the depth value of at least one tenth pixel corresponding to the same label as a label corresponding to the eighth pixel, a position difference between the eighth pixel and the tenth pixel, and a color difference between the eighth pixel and the tenth pixel in operation S442.

Next, a fifth depth histogram may be generated by using the depth value of at least eleventh pixel that surrounds the third set and to which the depth value is assigned, a position difference between the eighth pixel and the eleventh pixel, and a color difference between the eighth pixel and the eleventh pixel in operation S443.

Next, in operation S444, a depth value that maximizes points of a Markov Random Field that is modeled by using a weight based on a color difference between the eighth pixel and pixels adjacent to the eighth pixel and the summed histogram may be set for a depth value of the eighth pixel. The points of the Markov Random Field that is modeled by using a weight based on a color difference between a pixel adjacent to the eighth pixel and the eighth pixel and the summed histogram may be expressed as in Equation 9 below.

$$S(\{p\}) = \sum_x h_x^T p_x + \lambda \sum_x \sum_{y \in N_x} w_{x,y} p_x^T p_y$$ [Equation 9]

In Equation 9, px denotes a vector having the same level as a quantization level of a depth histogram. Also, if x has a depth value d, px is set as follows: px(d) which is a d-th factor is 1, and the rest of factors are 0. $W_{x,y}$ is a weight based on a color difference between two adjacent pixels, and may be expressed as in Equation 10 below.

$$w_{x,y} = \exp\left(-\frac{\|I_x - I_{x'}\|^2}{2\sigma_I^2}\right) \sum_k \delta(l_x^{(k)} - l_y^{(k)})$$ [Equation 10]

In Equation 10, δ(x) is a function that is 1 when x is 0 and is otherwise 0. $l_x^{(k)}$ denotes a label that includes an area that is segmented by using a k-th image segmentation method and includes x. Accordingly, $W_{x,y}$ may be greater when two adjacent pixels are in areas having the same label than when two adjacent pixels are in areas having different labels.

{p} which maximizes a function S({p}) regarding the points of the Markov Random Field may be calculated by using a relaxation labeling algorithm. According to the relaxation labeling algorithm, p may be calculated as expressed in Equation 11 below.

$$q_x^{odd} \leftarrow h_x + \sum_{x' \in N(x)} w_{x,x'} \cdot p_{x'}^{odd},$$

$$p_x^{new}(d) \leftarrow \frac{p_x^{old}(d) \cdot q_x^{old}(d)}{\sum_l p_x^{odd}(l) \cdot q_x^{old}(l)},$$ [Equation 11]

In Equation 11, a variable labeled with "old" denotes a previous value in an iteration process. Also, a variable labeled with "new" denotes a currently updated value in the iteration process.

Figure 34:
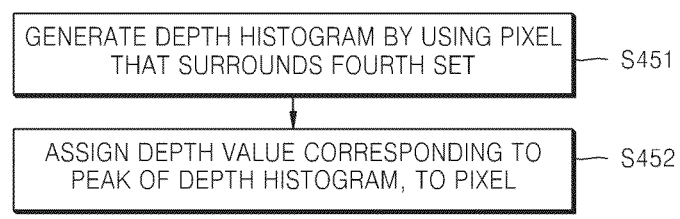
FIG. 34 is a flowchart illustrating an operation of generating a depth histogram for a pixel of a fourth set and assigning a depth value to the pixel, according to another embodiment.

Referring to FIG. 28, in operation S450, a depth histogram may be generated for pixels of the fourth set based on positions, and depth values may be assigned to the pixels. FIG. 34 is a flowchart illustrating an operation of generating a depth histogram for a pixel of a fourth set and assigning a depth value to the pixel, according to another embodiment.

Referring to FIG. 34, in operation S451, first, for twelfth pixels included in the fourth set, a depth histogram may be generated by using the depth value of at least one thirteenth pixel that surrounds the fourth set and to which the depth value is assigned, and a position difference between the twelfth pixel and the thirteenth pixel. Next, the depth value corresponding to a peak of the depth histogram may be set to a depth value of the twelfth pixel in operation S452.

Figure 35:
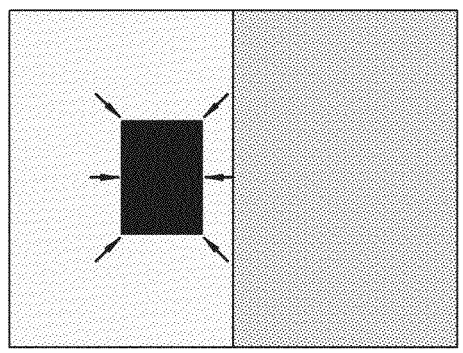
FIG. 35 is a reference diagram illustrating an operation of generating a depth histogram by using a pixel surrounding a fourth set, according to an embodiment.

FIG. 35 is a reference diagram illustrating a process of generating a depth histogram by using a pixel surrounding a fourth set according to an embodiment.

Referring to FIG. 35, between a first point belonging to an area indicated by arrows and an arbitrary second point of a large rectangular area on the right side, third points included in a large rectangular area on the left side are present, and thus, the first point and the second point may be physically connected to each other. In this case, a depth histogram may be generated by using the third points on the left, large rectangular area, which surround the area indicated by the arrows and to which a depth value is assigned. The depth histogram may be expressed as in Equation 12 below.

$$h_{x|SRND}(d) = \sum_{x' \in W(x) \cap SRND(x)} G_x(x - x')G_d(d - d')$$ [Equation 12]

Figure 36:
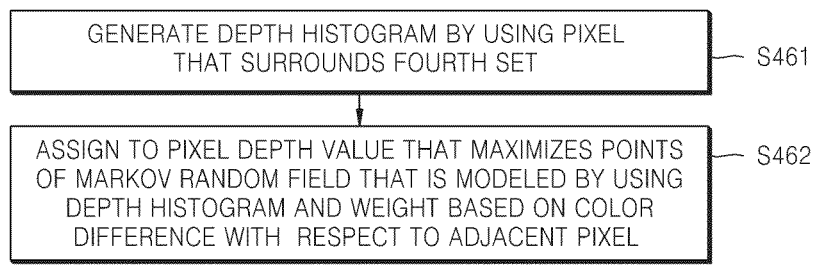
FIG. 36 is a flowchart illustrating an operation of generating a depth histogram for a pixel of a fourth set and assigning a depth value to the pixel, according to another embodiment.

FIG. 36 is a flowchart illustrating an operation of generating a depth histogram for a pixel of a fourth set and assigning a depth value to the pixel, according to another embodiment. Referring to FIG. 36, first, in operation S461, for each of twelfth pixels included in the fourth set, a depth histogram may be generated by using the depth value of at least one thirteenth pixel that surrounds the fourth set and to which the depth value is assigned, and a position difference between the twelfth pixel and the thirteenth pixel.

Next, a depth value that maximizes points of a Markov Random Field that is modeled by using a weight based on a color difference between the twelfth pixel and pixels adjacent to the twelfth pixel and the depth histogram may be set for a depth value of the twelfth pixel in operation S462.

Figure 37:
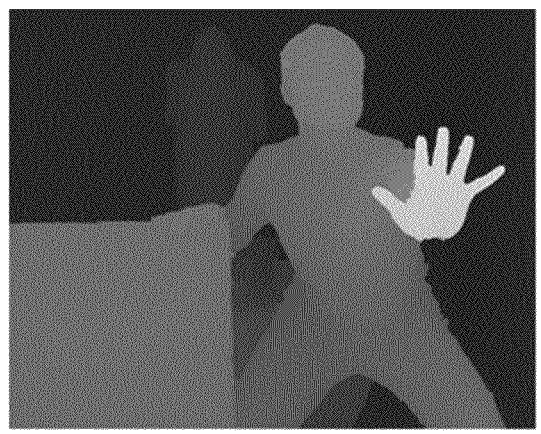
FIG. 37 is a visual image illustrating a result of outputting a color image to which a depth value is assigned, according to an embodiment.

Referring to FIG. 1 again, next, the color image to which the depth value is assigned may be output in operation S500. FIG. 37 is a visual image illustrating a result of outputting a color image to which a depth value is assigned, according to an embodiment. Also, when edge-preserving smoothing or the like is applied to the result of the output during post processing, a depth map having a high accuracy may be obtained.

Figure 38:
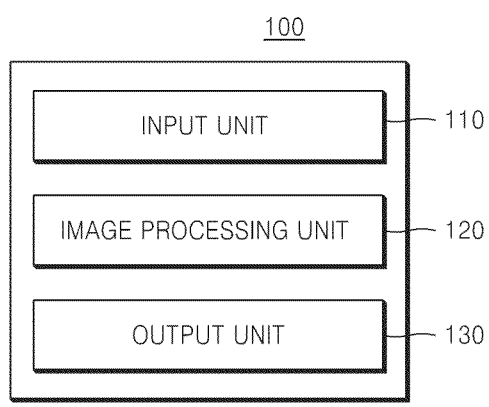
FIG. 38 is a block diagram illustrating a structure of an image processing apparatus according to an embodiment.

FIG. 38 is a block diagram illustrating a structure of an image processing apparatus 100 according to an embodiment. Referring to FIG. 38, the image processing apparatus 100 may include an input unit 110, an image processing unit 120, and an output unit 130.

The input unit 110 may receive or generate a depth map or a color image with respect to a predetermined scene. The input unit 110 may receive a depth map and a color image from the outside. Also, the input unit 110 may include a depth sensor which is one of a stereoscopic camera, a pattern projection camera, a TOF camera, and other similar devices. Also, the input unit t110 may include any optical photographing device from among a CMOS camera, a CCD camera, and other similar devices.

Details regarding the input unit 110 correspond to operation S100 of receiving a depth map and a color image described above, and thus, a detailed description thereof will be omitted here.

The image processing unit 120 may project each point included in the depth map onto the color image, and generate a result of segmenting the color image, onto which the depth map is projected, by using at least two image segmentation methods, classify the points included in the color image into at least one set according to the respective segmentation results, and set a depth value with respect to the points of the color image included in the at least one set.

Details of the image processing unit 120 correspond to operations S200 through S400, and thus, a detailed description thereof will be omitted here.

The output unit 130 may output the color image to which a depth value is assigned. Details of the output unit 130 correspond to operation S500 of outputting the color image to which the depth value is assigned, described above, and thus, a detailed description thereof will be omitted here.

As described above, according to the one or more of the above embodiments, by using a color image having a higher resolution than that of a depth map, a resolution of the depth map may be upsampled to the resolution of the color image. Also, the depth map may be upsampled such that a boundary of the depth map with respect to an object corresponds to a boundary of the color image of the object. Also, a resolution of the depth map may be upsampled to a higher resolution. In addition, by using a depth map and a color image respectively received by using a depth sensor and a color camera having similar viewpoints and directions, a depth map having the same viewpoint and the same resolution as the viewpoint and the resolution of the color image may be generated.

Examples of computer-readable media or processor-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer or processor using an interpreter.

The described hardware devices may also be configured to act as one or more software modules in order to perform the operations of the above-described embodiments The method to measure a position of a beam may be executed on a general purpose computer or processor or may be executed on a particular machine such as the network connection system or USB input/output server device described herein. Any one or more of the software modules described herein may be executed by a dedicated processor unique to that unit or by a processor common to one or more of the modules.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An image processing method, comprising:
   receiving a depth map and a color image with respect to a predetermined scene;
   projecting a plurality of points included in the depth map, onto the color image;
   segmenting the color image, onto which the plurality of points included in the depth map are projected, by using at least a first segmentation method to generate at least a first segmentation result;
   segmenting the color image, onto which the plurality of points included in the depth map are projected, by using at least a second segmentation method to generate at least a second segmentation result;
   classifying the plurality of points into at least one set according to at least the respective first and second segmentation results;
   assigning a depth value to the plurality of points in the set; and
   outputting the color image, to which the depth value is assigned,
   wherein the first and second image segmentation methods are different to each other.

2. The image processing method of claim 1, wherein a map resolution of the depth map is lower than an image resolution of the color image.

3. The image processing method of claim 1, wherein the projecting of the plurality of points included in the depth map, onto the color image comprises:
   detecting discontinuous points from among a plurality of first points of the depth map, which are discontinuous from second points, by using the depth values of the plurality of first points and depth values of the second points adjacent to the first points;
   generating meshes by using differences between the depth values of the first points and the depth values of the second points, and the first points; and
   projecting the meshes onto the color image.

4. The image processing method of claim 3, wherein the detecting discontinuous points from among the first points, which are discontinuous from the second points, comprises one of detecting a discontinuous point by using a difference between the depth value of the one of the first points and the depth value of one of the second points and a result of determining whether, from among at least one object existing within the scene, a first object corresponding to the one of the first points and a second object corresponding to the one of the second points are identical to each other.

5. The image processing method of claim 3, wherein the detecting discontinuous points from among the first points, which are discontinuous from the second points, comprises:
calculating a vector corresponding to a tangential plane of the one of the first points with respect to each of the first points of the depth map;
calculating minimum values from among differences between predicted depth values of the one of the first points calculated by using the vector of at least one third point included in a predetermined area around the one of the first points, and the depth value of the one of the first points included in the depth map, for each of the first points; and
detecting discontinuous points from among the first points, from the second points, by using the depth values of the first points, the depth values of the second points, the minimum values of the first points, and the minimum values of the second points.

6. The method of claim 3, wherein the generating meshes comprises:
connecting to one of the first points a fourth point adjacent to the one of the first points in a horizontal direction;
connecting to the one of the first points a fifth point adjacent to the one of the first points in a vertical direction; and
connecting points corresponding to a smaller value from among a difference between the depth value of the fourth point and the depth value of the fifth point and a difference between a depth value of a sixth point adjacent to the fourth point in a vertical direction and to the fifth point in a horizontal direction and the depth value of the one of the first points.

7. The image processing method of claim 3, wherein the projecting produces projected meshes and the classifying the plurality of points included in the color image into at least one set comprises:
assigning a depth value to the plurality of points included in the projected meshes by using a depth value of each vertex of the projected meshes;
detecting at least one mesh, from among the projected meshes, that includes at least one vertex covered by another mesh, and a discontinuous area including an area of a predetermined range around the discontinuous points;
detecting a hole area, from the projected meshes, including at least one mesh including at least one discontinuous point;
generating at least one virtual vertex in the hole area;
segmenting the color image by using the at least two image segmentation methods, the at least one vertex, and the at least one virtual vertex; and
classifying the points included in the color image into the at least one set according to respective segmentation results.

8. The image processing method of claim 7, wherein the assigning of a depth value to the plurality of points included in the projected meshes comprises:
interpolating and assigning the depth values to the plurality of points included in the projected meshes by using plane equations based on positions of vertexes of the projected meshes; and
setting a smallest value from among the depth values corresponding to the points, with respect to a point corresponding to at least two of the meshes from among the points included in the color image.

9. The image processing method of claim 7, wherein the segmenting the color image by using the at least two image segmentation methods, the at least one vertex, and the at least one virtual vertex comprises:
generating, by using a first image segmentation method, a first segmentation image obtained by segmenting the color image, onto which a mesh is projected, into at least one area that includes either one of the vertexes or one of the virtual vertexes, or that does not include any of the vertexes nor any of the virtual vertexes; and
generating, by using a second image segmentation method different from the first image segmentation method, a second segmentation image obtained by segmenting the color image, onto which the mesh is projected, into at least one area that includes either one of the vertexes or one of the virtual vertexes, or that does not include any of the vertexes nor any of the virtual vertexes.

10. The image processing method of claim 9, wherein the classifying of the points included in the color image into the at least one set according to the respective segmentation results comprises:
generating a third segmentation image obtained by segmenting the depth map into at least one area and assigning different first labels to respective areas of the third segmentation image;
assigning, to the respective areas of the first segmentation image, a second label corresponding to the first label assigned to the areas of the third segmentation image corresponding to vertexes included in the respective areas of the first segmentation image;
assigning a third label corresponding to the first label assigned to the areas of the third segmentation image corresponding to the vertexes included in the respective areas of the second segmentation image to the respective areas of the second segmentation image; and
generating a first set including the at least one first pixel in which labels corresponding to the at least one first pixel and a second pixel of the second segmentation image corresponding to the first pixel are identical.

11. The image processing method of claim 10, wherein the assigning of a depth value to the plurality of points in the set comprises generating a depth histogram for each of third pixels included in the first set based on a color and a position of a one of the third pixels and setting the depth value corresponding to a peak of the depth histogram, as a depth value of the one of the third pixels.

12. The image processing method of claim 10, wherein the assigning of a depth value to each of the plurality of points of the color image included in the set comprises:
generating a first depth histogram for each of third pixels included in the first set using the depth value of at least one fourth pixel included in an area of a predetermined range around one of the third pixels and to which the depth value is assigned, a position difference between the one of the third pixels and the fourth pixel, and a color difference between the one of the third pixels and the fourth pixel;
generating a second depth histogram by using the depth value of at least one fifth pixel corresponding to a same label as a label corresponding to the one of the third pixels, a position difference between the one of the third pixels and the fifth pixel, and a color difference between the one of the third pixels and the fifth pixel; and setting the depth value corresponding to a peak of a result of summing the first and second depth histograms, to which weights are respectively applied, as a depth value of the one of the third pixels.

13. The image processing method of claim 10, wherein the classifying the points into the set according to the respective segmentation results further comprises:

generating a second set including, from among first pixels, the at least one first pixel in which at least one of the area corresponding to the first pixel or the area corresponding to the second pixel corresponding to the first pixel includes the virtual vertex.

14. The image processing method of claim 13, wherein the assigning a depth value to the plurality of points included in the set comprises selecting sixth pixels included in the second set based on colors and positions of the sixth pixels, segmenting the sixth pixels into at least one sub-set that includes a seventh pixel to which the depth value is assigned, setting a depth value of the seventh pixel included in the sub-set in which the sixth pixels are included, as a depth value of the sixth pixels.

15. The image processing method of claim 10, wherein the classifying of the points included in the color image into the at least one set according to the respective segmentation results further comprises generating, from among the first pixels, a third set including the at least one first pixel, the label of which is different from the label corresponding to the at least one first pixel corresponding to the second pixel, and whose area corresponding to the first pixel or corresponding to the second pixel corresponding to the first pixel includes the at least one vertex.

16. The image processing method of claim 15, wherein the assigning a depth value to the plurality of points included in the set comprises:

generating, for each of eighth pixels included in the third set, a third depth histogram generated based on the depth value of at least one ninth pixel included in an area of a predetermined range around the eighth pixel and to which the depth value is assigned, a position difference between the eighth pixel and the ninth pixel, and a color difference between the eighth pixel and the ninth pixel;

generating a fourth histogram by using the depth value of at least one tenth pixel corresponding to a same label as a label corresponding to the eighth pixel, a position difference between the eighth pixel and the at least one tenth pixel, and a color difference between the eighth pixel and the at least one tenth pixel;

generating a fifth depth histogram by using the depth value of at least one eleventh pixel that surrounds the third set and to which the depth value is assigned, a position difference between the eighth pixel and the at least one eleventh pixel, and a color difference between the eighth pixel and the at least one eleventh pixel; and generating a summed histogram obtained by summing the third, fourth, and fifth depth histograms by applying weights to the third, fourth, and fifth depth histograms.

17. The image processing method of claim 16, further comprising, after the generating of the summed histogram, setting the depth value corresponding to a peak of the first summed histogram as a depth value of the eighth pixel.

18. The image processing method of claim 16, further comprising, after generating a summed histogram, setting a depth value that maximizes points of a Markov Random Field modeled by using a weight based on a color difference between the eighth pixel and a pixel adjacent to the eighth pixel and the summed histogram, as a depth value of the eighth pixel.

19. The image processing method of claim 10, wherein the classifying of the points included in the color image into the at least one set according to the respective segmentation results further comprises:

generating a fourth set including, from among the plurality of first pixels, the at least one first pixel in which the area corresponding to the first pixel and the area corresponding to the second pixel corresponding to the first pixel do not include any of the vertexes nor any of the virtual vertexes.

20. The image processing method of claim 19, wherein the assigning of a depth value to the plurality of points included in the set comprises generating a depth histogram, for each of twelfth pixels included in the fourth set, by using the depth value of at least one thirteenth pixel that surrounds the fourth set and a position difference between the twelfth pixel and the thirteenth pixel.

21. The image processing method of claim 20, further comprising, after generating a depth histogram, setting the depth value corresponding to a peak of the depth histogram as a depth value of the twelfth pixel.

22. The image processing method of claim 20, further comprising, after generating a depth histogram, setting a depth value that maximizes points of a Markov Random Field modeled by using a weight based on a color difference between the twelfth pixel and a pixel adjacent to the twelfth pixel, and by using the depth histogram, as a depth value of the twelfth pixel.

23. An image processing apparatus, comprising:
an input unit configured to comprise a depth map and a color image of a predetermined scene;
an image processing unit configured to project a plurality of points included in the depth map, segment the color image onto which the depth map points are projected by using at least a first segmentation method to generate at least a first segmentation result, segment the color image onto which the depth map points are projected by using at least a second segmentation method to generate at least a second segmentation result, classify the plurality of points into at least one set according to at least the respective first and second segmentation results, and assign depth values to the plurality of points in the at least one set; and
an output unit configured to output the color image, to which the depth values are assigned,
wherein the first and second image segmentation methods are different to each other.

24. The image processing apparatus of claim 23, wherein a map resolution of the received depth map is lower than an image resolution of the received color image.

25. A method, comprising:
obtaining a depth map and a color image of a scene having an object therein where the object has a boundary, the depth map has a first spatial resolution and the color image has a second spatial resolution higher than the first resolution; and
up-sampling the first spatial resolution to match the second spatial resolution with the object boundary in the depth map and the color image matching, the up-sampling comprising:
projecting a plurality of points included in the depth map, onto the color image, and correlating points with depth values within a threshold of each other and forming a mesh of correlated points of the color image.

26. A method, comprising:
obtaining a depth map and a color image of a scene;
projecting the depth map onto the color image by:
- correlating points with depth values within a threshold of each other and forming a mesh of correlated points of the color image,
- segmenting the color image using the mesh and the depth values and generating sets from the segments responsive to common features of the segments, and
- assigning set depth values to the sets; and
- outputting the set depth values corresponding to color pixels of the color image.

27. The method of claim 26, wherein the common features comprise segments comprising a same label, segments not comprising the same label, segments comprising a same virtual vertex, and segments not comprising the same virtual vertex.

* * * * *